United States Patent [19]
Pounds et al.

[11] Patent Number: 5,517,556
[45] Date of Patent: May 14, 1996

[54] CALL PROCESSING SYSTEM WITH FACSIMILE PROCESSING

[75] Inventors: Gregory E. Pounds, San Jose; David J. Ladd, Saratoga; Tim J. Kusumi, Los Gatos; Robert H. Sinn, Sunnyvale; Eric K. Wood, Pleasanton, all of Calif.

[73] Assignee: VMX, Inc., San Jose, Calif.

[21] Appl. No.: 948,141

[22] Filed: Sep. 18, 1992

[51] Int. Cl.$^6$ .............................. H04M 1/27; H04M 3/50
[52] U.S. Cl. .............................. 379/67; 379/93; 379/100; 379/88; 379/89
[58] Field of Search ..................... 379/777, 67, 93, 379/100, 88, 89; 358/404

[56] References Cited

U.S. PATENT DOCUMENTS

| | | | |
|---|---|---|---|
| 3,931,470 | 1/1976 | Zimmenmann | 379/77 |
| 4,340,783 | 7/1982 | Sugiyama et al. | 379/98 |
| 4,837,798 | 6/1989 | Cohen et al. | 379/88 |
| 4,891,835 | 1/1990 | Leung | 379/88 |
| 4,935,955 | 6/1990 | Neudorfer | 379/100 |
| 5,008,926 | 4/1991 | Misholi | 379/100 |
| 5,072,309 | 12/1991 | Brown | 379/100 |
| 5,086,455 | 2/1992 | Satomi | 379/100 |
| 5,127,047 | 6/1992 | Bell | 379/100 |
| 5,146,348 | 9/1992 | Kaneyama | 379/100 |
| 5,151,972 | 9/1992 | Lorenz | 379/100 |
| 5,193,110 | 3/1993 | Jones | 379/100 |
| 5,220,438 | 6/1993 | Yamamoto | 358/404 |
| 5,258,853 | 11/1993 | Nobuta | 358/404 |
| 5,270,833 | 12/1993 | Kubokawa | 379/100 |
| 5,283,638 | 2/1994 | Engberg | 379/100 |
| 5,301,035 | 4/1994 | Hayafune | 358/404 |

FOREIGN PATENT DOCUMENTS

| | | | |
|---|---|---|---|
| 59-214366 | 12/1984 | Japan | H04M 3/42 |
| 62-132464 | 6/1987 | Japan | H04M 3/42 |
| 2211698 | 7/1989 | United Kingdom | H04M 11/08 |

Primary Examiner—Jeffery A. Hofsass
Assistant Examiner—Scott Wolinsky
Attorney, Agent, or Firm—Haverstock & Associates

[57] ABSTRACT

An improved telephone call processing apparatus for processing facsimile messages. The facsimile processing apparatus comprises a message control system including a voice control unit (VCU), a control processor unit (CPU), and a telephone line card. Multiple buses including a high speed voice/data bus, a control bus, and a time division multiplexed (TDM) bus are used to couple the VCU, the CPU and the line card. The high speed data bus is dedicated for voice and data transmission only. The control bus is dedicated to command controls and system background tasks. The TDM bus is used to make full duplex voice connections between individual line card ports and facsimile message controller modem channels. The CPU manages the connections between line card ports and fax channels. The VCU comprises a high speed processor and a control processor. The VCU controls the transmission of voice and facsimile data over the high speed data bus to and from a non-volatile message storage unit, the line card, and a facsimile message controller (FMC). The cooperative processing of these components provides a highly integrated and versatile apparatus for processing both voice and facsimile messages in an integrated environment. Facsimile messages may be received, stored, forwarded, and sent from mailboxes. Status information pertaining to the facsimile messages is maintained and accessible to users via telephone line links.

14 Claims, 24 Drawing Sheets

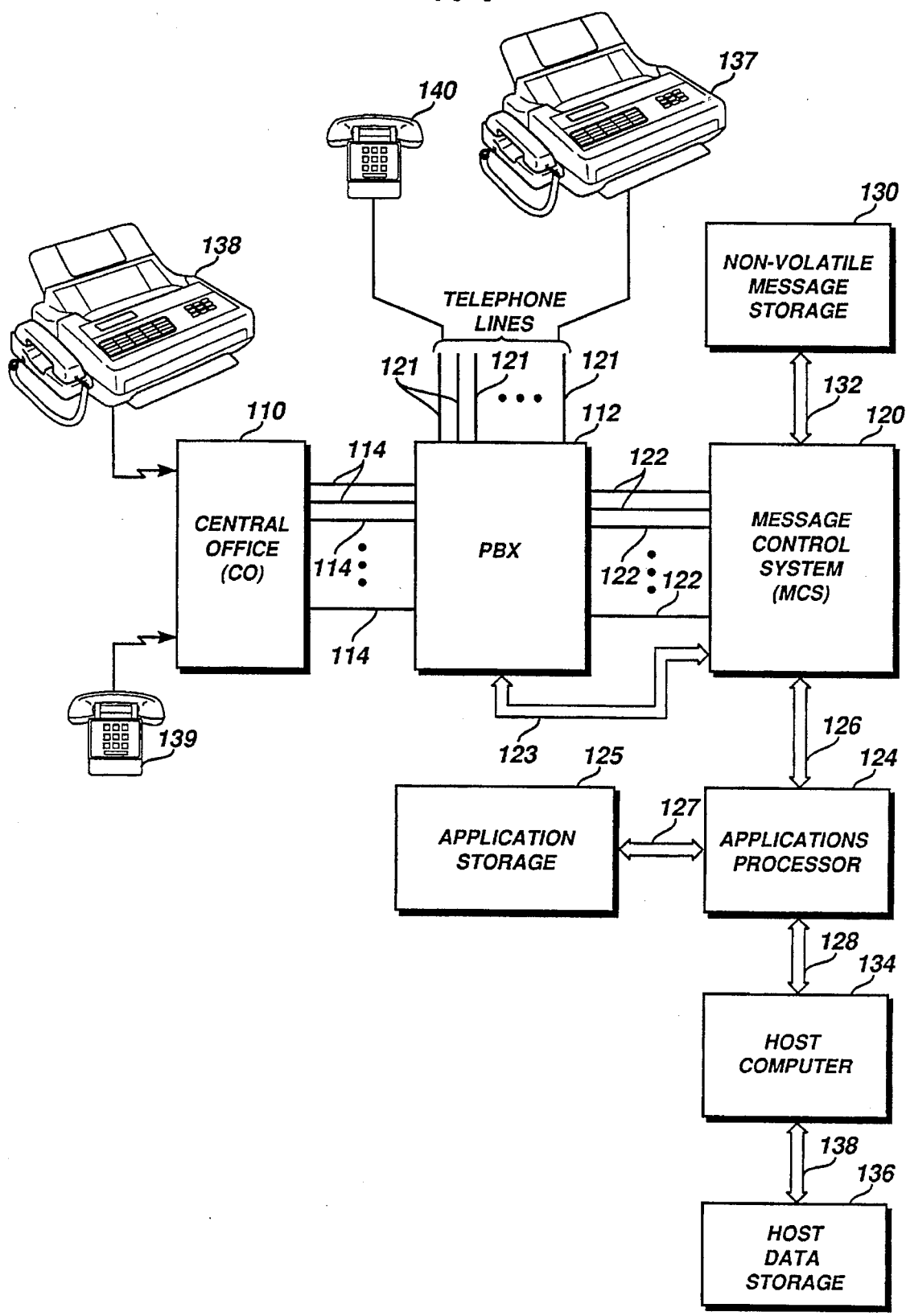

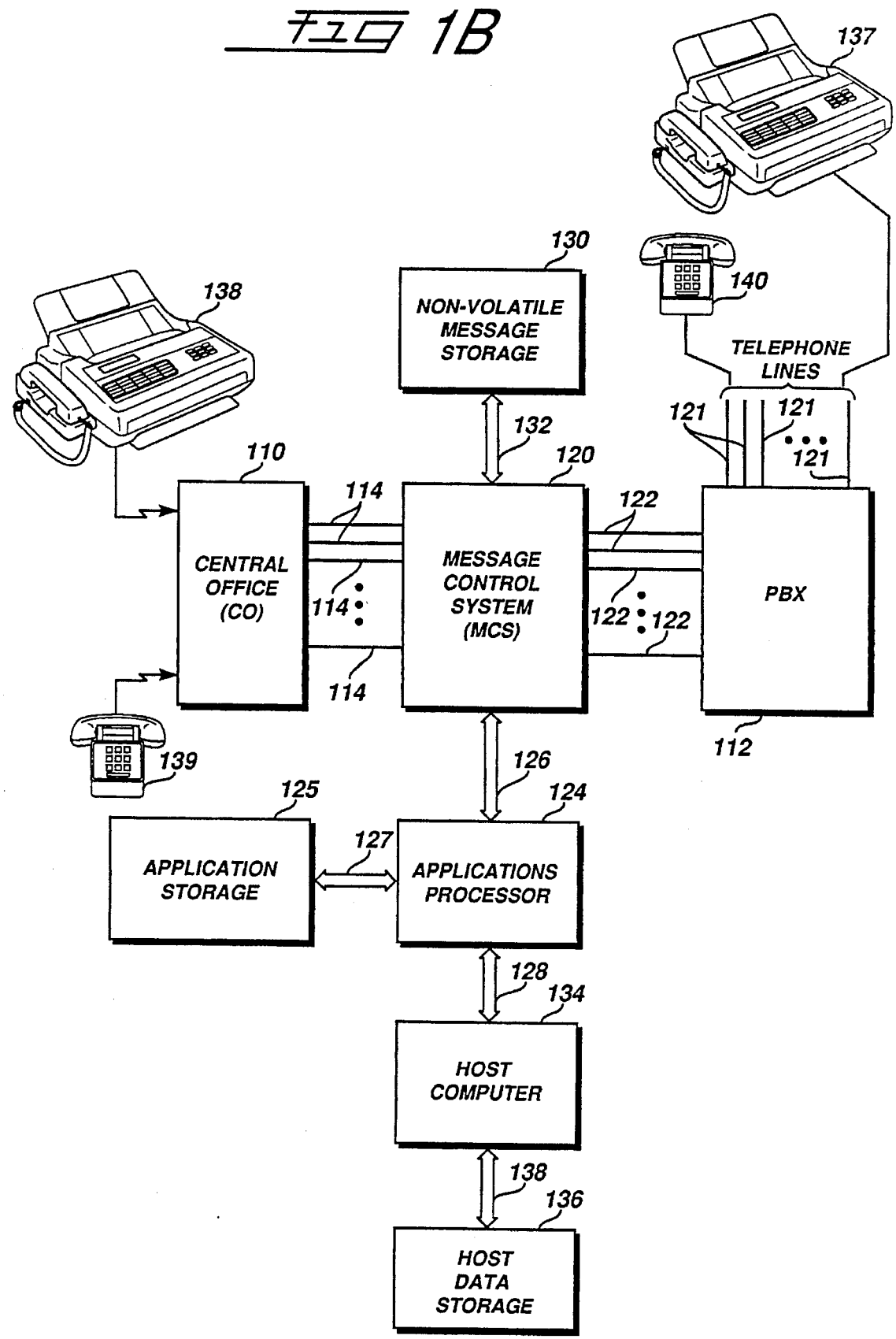

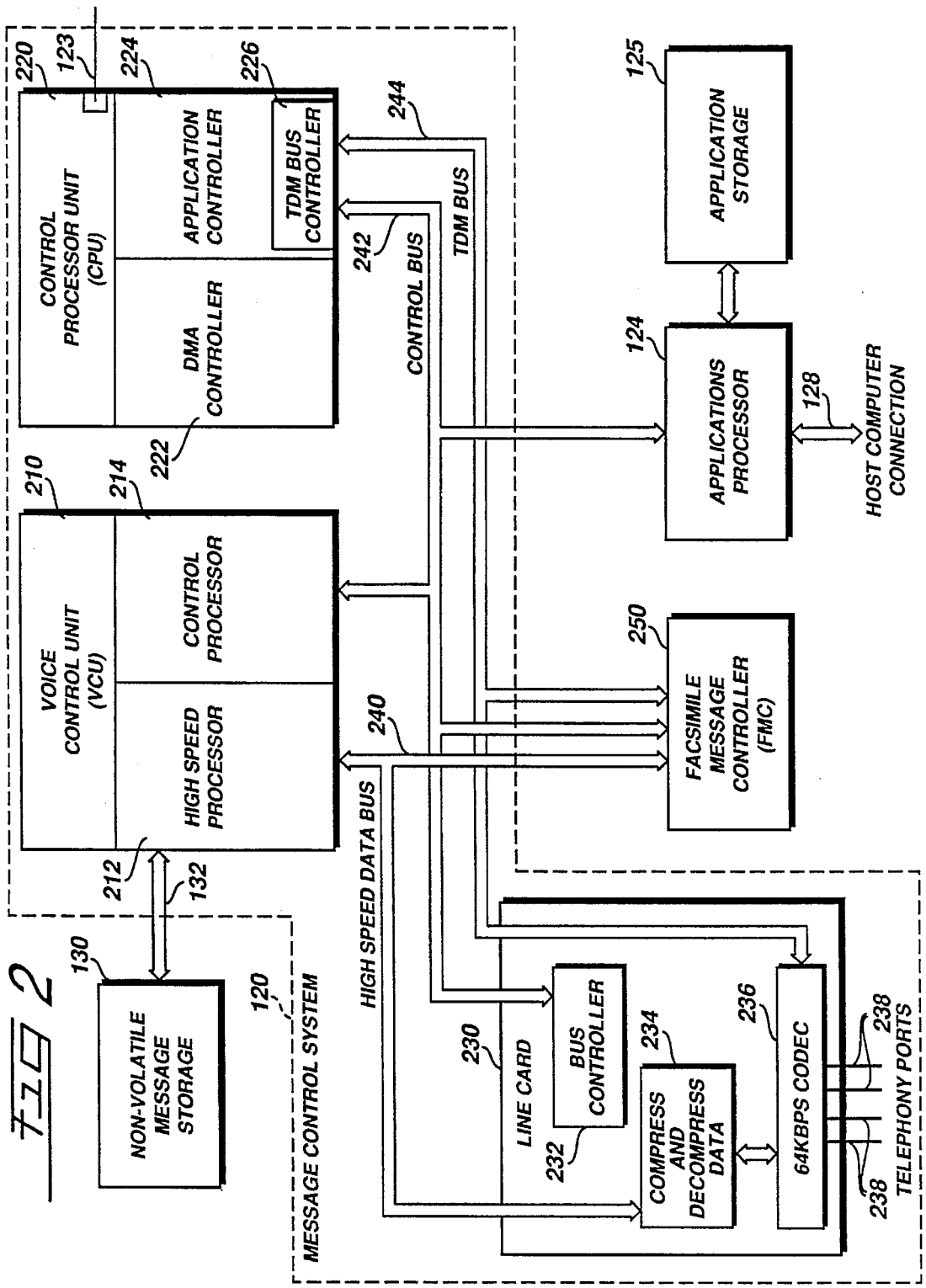

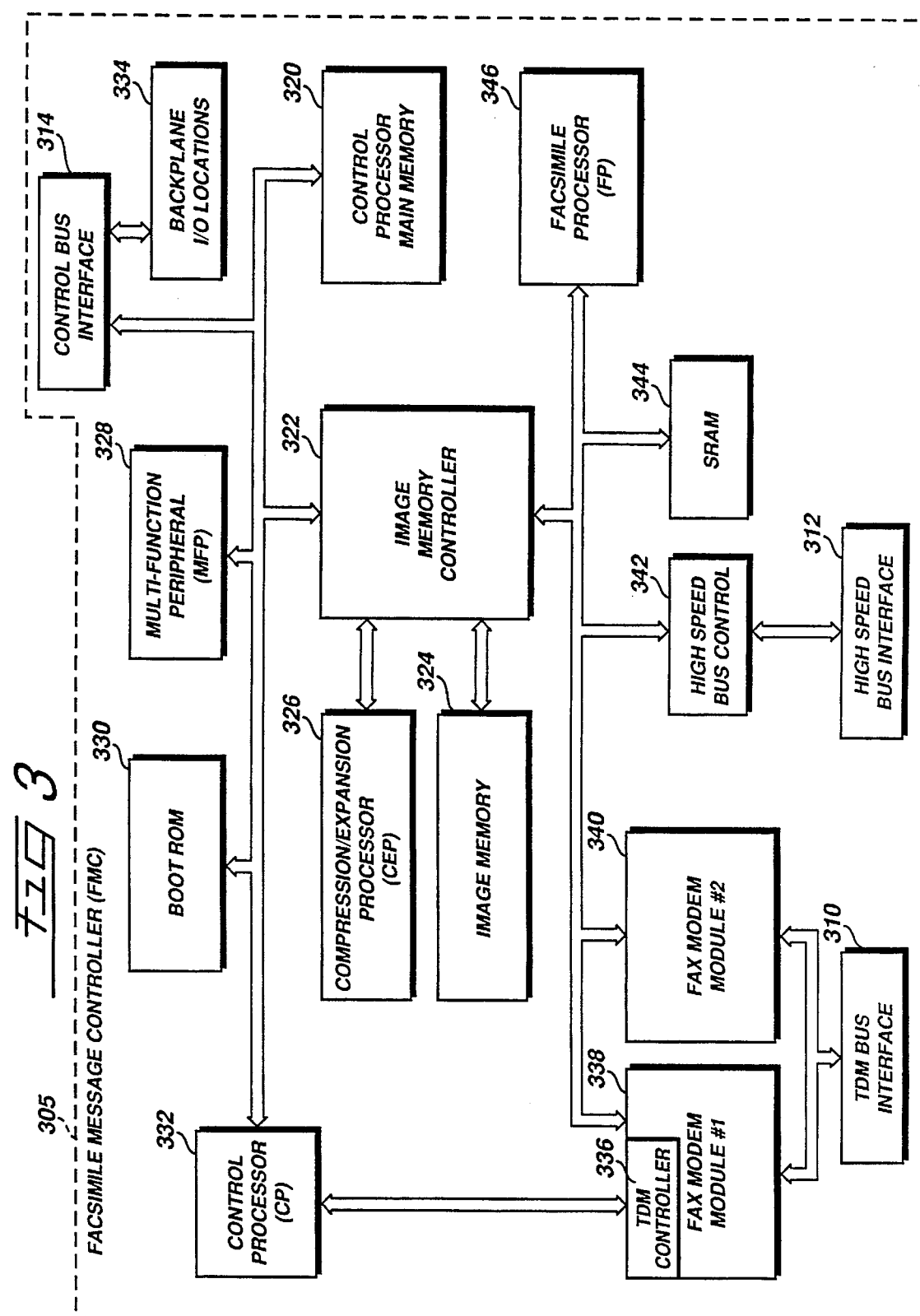

INTERRUPT SOURCE REGISTER (Fig. 5)

| BIT | 7 | 6 | 5 | 4 | 3 | 2 | 1 | 0 |
|---|---|---|---|---|---|---|---|---|
| | BACKPLANE INTERRUPT | CEP INTERRUPT | FP INTERRUPT | WATCH DOG TIMER TIME OUT INTERRUPT | IMAGE MEMORY PARITY ERROR (HIGH) INTERRUPT | IMAGE MEMORY PARITY ERROR (LOW) INTERRUPT | CONTROL MEMORY PARITY ERROR (HIGH) INTERRUPT | CONTROL MEMORY PARITY ERROR (LOW) INTERRUPT |

TDM REGISTER (Fig. 6)

| BIT | 7 | 6 | 5 | 4 | 3 | 2 | 1 | 0 |
|---|---|---|---|---|---|---|---|---|
| | TDM STATUS 1 | TDM STATUS 0 | NOT USED | TDM ENABLED | BUS SELECT 1 | BUS SELECT 0 | GROUP SELECT 1 | GROUP SELECT 0 |

*Fig. 6*

| FP I/O REGISTERS |
|---|
| HIGH SPEED BUS REGISTER FILE — 1010 |
| HIGH SPEED BUS INTERRUPT ENABLE — 1012 |
| RESET FAX MODEMS — 1014 |
| HIGH SPEED BUS REQUEST — 1016 |
| ENABLE INTERRUPTS — 1018 |
| HIGH SPEED DATA BUS READ REQUEST REGISTER — 1020 |
| INTERRUPT CP — 1022 |
| WRITE REQUESTS — 1024 |
| CLEAR REQUESTS — 1026 |
| CABLE REGISTER ON FAX MODEM MODULE #1 — 1028 |
| CABLE REGISTER ON FAX MODEM MODULE #2 — 1030 |
| CLEAR REAL TIME CLOCK INTERRUPT — 1032 |
| CLEAR CP INTERRUPT — 1034 |
| CLEAR HIGH SPEED DATA BUS ERROR INTERRUPT — 1036 |
| READ INTERRUPT SOURCE — 1038 |

FIG 10

| | 1110 | 1112 | 1114 | 1116 |
|---|---|---|---|---|
| | REFRESH CLOCK INTERRUPT | HIGH SPEED DATA BUS ERROR INTERRUPT | CONTROL PROCESSOR (CP) INTERRUPT | HIGH SPEED DATA BUS SERVICE REQUEST |

FIG 11

CALL PROCESSING SYSTEM WITH FACSIMILE PROCESSING

BACKGROUND OF THE INVENTION

1. Field of the Invention

The present invention relates to the field of telephone call processing systems. Specifically, the present invention relates to call processing systems with facsimile processing capability.

2. Prior Art

Telephone communication has expanded from a purely voice medium to a system supporting all types of information interchange. It has become increasingly important to be able to handle a multitude of incoming telephone lines each of which may support voice communication, facsimile transmissions, or other forms of information interchange. One well-known way of handling the multitude of incoming telephone lines is the use of a private branch exchange (PBX) or central exchange (Centrex). A PBX or Centrex is a telephone exchange system serving an organization, which may be coupled with multiple incoming and outgoing trunk lines and multiple telephone sets at the organization's premises. PBX or Centrex systems provide a variety of functions such as switching of calls from the incoming trunk lines to any of the extensions, switching calls between two extensions and switching calls between extensions and outgoing trunk lines. Numerous PBX and Centrex systems are well-known and commercially available.

Conventional call processing and voice messaging system are known in the art and are commercially available. These call processing systems may be coupled with a PBX or Centrex and used to automate the answering of incoming calls from the outside telephone network and the taking of messages when the extensions are not answered by the called parties. These prior art call processing systems include (1) automated attendant systems for directing incoming calls to an extension, (2) voice messaging systems for handling a call that does not complete connection to an extension, (3) two-way voice messaging systems or voice store and forward systems for speaking messages to a caller from fixed address mailboxes, and (4) interactive voice response systems for retrieving data from a database of information and response to a caller request and speaking messages to a caller. A telephone call processing system is described in copending patent application Ser. No. 07/660,279, entitled "Integrated Application Control Call Processing and Messaging System", filed Feb. 21, 1991.

The incorporation of facsimile capability into prior art call processing systems has proved too troubling, because facsimile transmissions and voice data cannot be transmitted on the same telephone line at the same time using the current telephone network. The tendency has been to dedicate one set of telephone lines for facsimile transmission and a different set of lines for voice data transmission. Thus, particular telephone lines with distinct telephone numbers are dedicated to the transmission of facsimile data. Although this solution is perfectly acceptable in some applications, the dedication of facsimile (fax) lines does not lend itself to a flexible system architecture.

In other prior art call processing systems, incoming telephone lines from a PBX or central office are routed into the call processing system through a series of voice ports. One voice port is provided for each incoming telephone line. For each voice port supporting only voice data communications, only a voice interface is provided in the voice port. For telephone lines supporting either voice data communications or facsimile data communications, a voice interface and a separate facsimile interface are provided within the voice port. Using an established set of commands, a caller or user may select either the voice interface or the facsimile interface for servicing a particular telephone call. In this manner, a particular telephone line may be used for both voice and facsimile data communications.

A number of problems exist with the prior art dual interface voice port architecture. First, it is necessary to predetermine which telephone lines will service facsimile data. These telephone lines must be provided with a facsimile interface. By having to predefine telephone lines that will service facsimile data, the overall flexibility of the call processing system is substantially decreased. Secondly, the cost of these prior art call processing systems is increased by having to provide facsimile interfaces for telephone lines that may not necessarily require them. Thus, these prior art call processing systems do not provide enough flexibility for allocating resources in an efficient manner.

Some prior art systems provide a capability known as fax-on-demand. Using this capability, a caller may dial into a fax-on-demand processing system and make selections from a menu of available fax information. Typically, selections are made using DTMF tones as entered on a telephone key pad. After the caller makes a selection, the fax-on-demand system transmits back to the caller the requested information by facsimile transmission means. Prior art fax on-demand systems typically employ a dual interface voice port for providing the fax on-demand service. As such, these systems suffer the same lack of flexibility in servicing both voice and facsimile data communications. Specifically, a strong distinction is made between the voice data communications and the facsimile data communications. These systems are unable to handle voice or facsimile data as a single source of information. It is, therefore, o difficult and cumbersome to move back and forth between the two transmission mediums.

Thus, a better call processing system for handling facsimile data communications is required.

SUMMARY OF THE INVENTION

The present invention is an improved call processing system providing better facsimile message control. The facsimile processing apparatus comprises a message control system including a voice control unit (VCU), a control processor unit (CPU), and a telephone line card. Multiple buses including a high speed voice/data bus, a control bus, and a time division multiplexed (TDM) bus are used to couple the VCU, the CPU and the line card. The high speed data bus is dedicated for voice and data transmission only. The control bus is dedicated to command controls and system background tasks. The TDM bus is used to make full duplex voice connections between individual line card ports and facsimile message controller modem channels. The CPU manages the connections between line card ports and fax channels. The VCU comprises a high speed processor and a control processor. The VCU controls the transmission of voice and facsimile data over the high speed data bus to and from a non-volatile message storage unit, the line card, and a facsimile message controller (FMC).

The present invention also provides processing logic (i.e. software) executing in the VCU and the CPU of the message control system. This software includes call processing logic for receiving a facsimile message and for transmitting a facsimile message.

The cooperative processing of these components provides a highly integrated and versatile means for processing both voice and facsimile messages in an integrated environment. Facsimile messages may be received, stored, forwarded, and sent from mailboxes. Status information pertaining to the facsimile messages is maintained and accessible to users via telephone line links. The details of the present invention are provided in the following detailed description.

BRIEF DESCRIPTION OF THE DRAWINGS

FIG. 1A is a block diagram illustrating a call processing system in which the present invention resides.

FIG. 1B illustrates an alternative embodiment of the present invention.

FIG. 2 is block diagram illustrating the message control system of the present invention.

FIG. 3 illustrates the facsimile message controller of the present invention.

FIG. 5 illustrates the interrupt source register format.

FIG. 6 illustrates the format of the TDM registers.

FIG. 10 illustrates the I/O control and status registers accessible to the facsimile processor.

FIG. 11 illustrates the format of the read interrupt source register.

DETAILED DESCRIPTION OF THE PREFERRED EMBODIMENT

Figure 4:
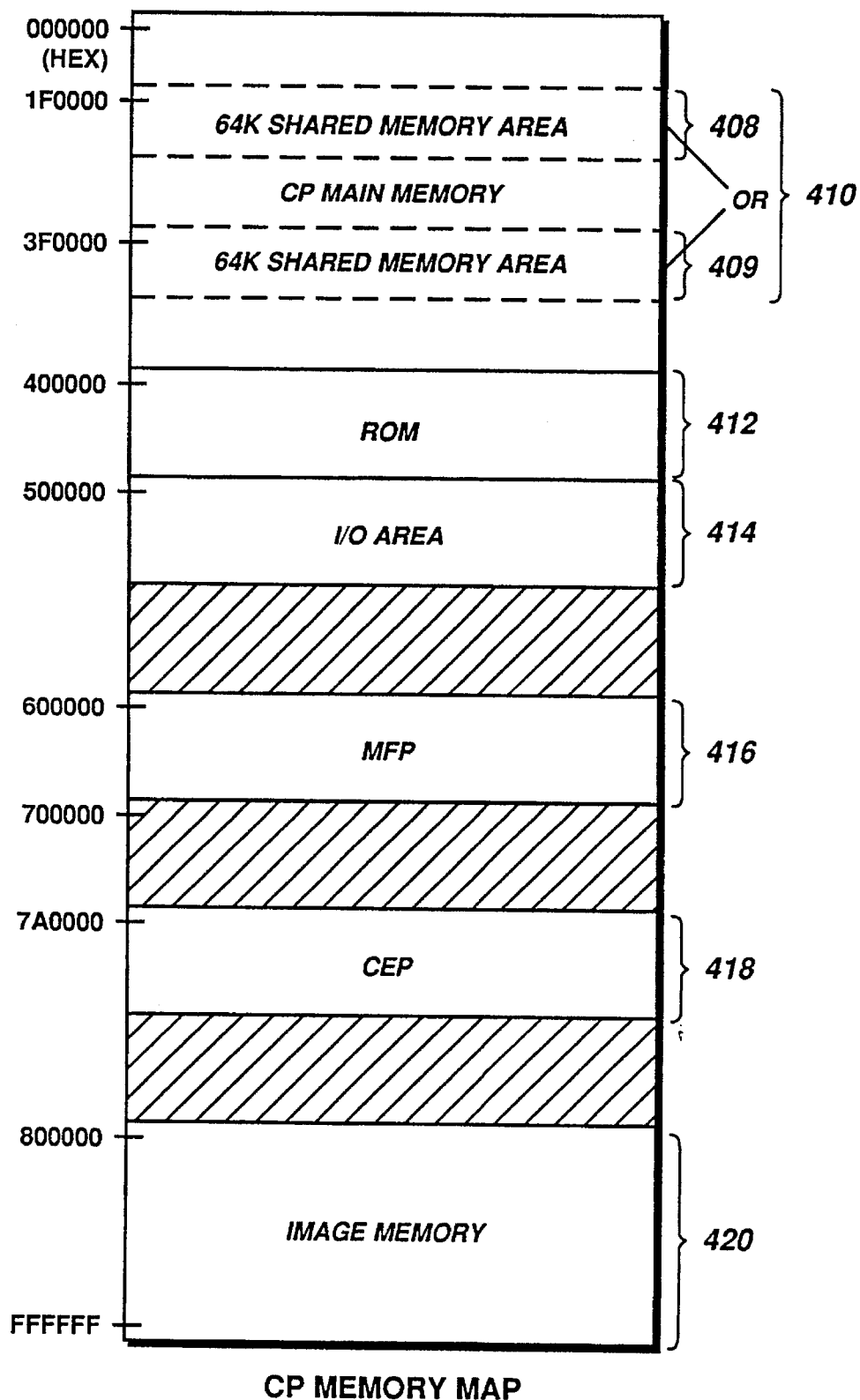
FIG. 4 illustrates the memory map of the address space as seen from Control Processor.

The present invention is a call processing system providing an improved facsimile data transmission control means. In the following description, numerous specific details are set forth such as specific prompts and menus, specific codes, etc. in order to provide a thorough understanding of the present invention. It will be apparent, however, to one of ordinary skill in the art, that the present invention may be practiced without these specific details. In other instances, well-known circuits, structures, and techniques have not been shown in detail in order not to unnecessarily obscure the present invention.

The present invention is an improved call processing system providing better control of facsimile data transmission. Although the following description makes specific reference to PBX systems, the present invention anticipates the use of the disclosed call processing system with other telephone switching systems such as a key system, central office or Centrex system, or hybrid system. Further, the methods for processing calls and facsimile messages described herein may be practiced in a system utilizing an external voice messaging system or may be equally practiced in a telephone switching system which provides the features of a voice messaging system as an integral function of the switching system. The methods for processing calls and fax messages described herein may be applied in a variety of systems in which the required call information may be obtained through the methods and apparatus detailed herein or through other methods and apparatuses. It will be appreciated that the methods of processing calls and fax messages are not intended to be limited to use of the disclosed methods and apparatus for obtaining call information, except as specifically provided in the claims.

Referring now to FIG. 1A, the call processing system in which the present invention operates is illustrated. A central office 110 is coupled to a private branch exchange (PBX) 112 via telephone lines 114. Representative telephone 139 or facsimile machine 138 can access the PBX via the Public Switched Network and the CO 110. Lines 114 are trunk lines provided as input to PBX 112. They could be DID (Direct Inward Dial) trunks which allows a telephone 139 or facsimile machine 138 to call directly to a selected one of telephone lines 121 of the PBX. They could also be regular central office lines which when accessed by a telephone 114 are usually directed by the PBX to ring an attendant or go directly to a specific line or group of lines 121 or 122. Individual telephone lines 121 are provided for direct connection of telephones 140 or facsimile machines 137 to PBX 112. The use of a PBX as connected to a central office is well-known in the art. PBX 112 is coupled to a message control system (MCS) 120 via individual telephone lines 122. Control line 123 connects PBX 112 to MCS 120. Control 123 provides the MCS 120 with call integration information including usable information regarding the source of a telephone call. A non-volatile storage unit 130 is coupled to MCS 120 via data lines 132. Non-volatile message storage unit 130 is a magnetic disk drive unit coupled to MCS 120 via a SCSI bus 132. Such a non-volatile storage device is well-known in the art.

Referring now to FIG. 1B, an alternate method of connection of the call processing system is shown. In this configuration the lines 114 from the Central Office 110 are of the DID type and connect directly to the MCS 114. The MCS 114 is then in-ram connected 122 to incoming DID line cards on the PBX. In this configuration there is no integrated link 123 between the PBX and MCS. Otherwise all other elements are the same as explained for FIG. 1A.

Using the call control system illustrated in FIG. 1A, telephone calls from 138 or 139 coming in on trunk lines 114 go directly to or are transferred to one of a plurality of telephones or facsimile machines 137 connected to telephone lines 121. If the telephone line thus accessed is busy or does not answer, the call may be forwarded to MCS 120 for further processing. Alternatively, calls coming in trunk lines 114 may be transferred directly to the appropriate line of telephone lines 122. It should be also be clear to one skilled in the art that telephones 140 or facsimile machines 137 connected to PBX 112 via lines 121 can also call other telephones, facsimile machines or the ports 122 going to the MCS system, and then be handled similarly to calls coming in on lines 114. MCS 120 may thereafter handle the call using a conventional voice messaging or two-way voice messaging capability with a voice mailbox stored on non-volatile message storage unit 130. Non-volatile message storage unit 130 contains a plurality of mailboxes each for storing a plurality of voice messages. Each mailbox stored on non-volatile message storage device 130 is associated with one of the extension telephone numbers associated with telephone lines 121 or a predetermined party. Use of voice mailboxes in this way is well-known in the art. In addition to providing MCS 120 with an incoming telephone call on lines 122, PBX 112 also provides MCS 120 with control information associated with a call on lines 122 on lines 123. This additional control information may include the trunk number on which the incoming call was received, and identification of the called party and a status indication such as whether the intended called party was busy or did not answer. Additional information may be passed via control lines 123 including the port number of the call and the extension number or the mailbox number associated with the incoming call. The types of control lines 123 are well known in the prior art and include a SMDI (Simplified Message Desk Interface) for Centrex and some PBXs. Other methods not using a separate control line 123 such as in-band DTMF or digital ISDN signaling set by the PBX on lines 122 is equivalent. When a call is received by MCS 120 along with its corresponding information on line 123, MCS 120 uses the information received on line 123 to determine how to process the call. It can be entirely processed in the MCS 120, or if specialized handling or host computer access is required, operate in cooperation with applications processor 124 to assign a call to a "call flow program" running in the applications processor 124. The processing of the call is then controlled by command sequence coded in the call flow. In addition to data received on link 123 determining how the call is processed, configuration data in the MCS or applications processor or user input can also determine a particular process in MCS 120 or applications processor 124 to control to call. Using the call control system illustrates in FIG. 1B, telephone calls from telephones 139 or facsimile machines 138 dial a specific DID number that the CO 110 sends to the MCS 120 on lines 114. The MCS system will handle the call as determined by the DID number dialed or information provided by the user or facsimile machine. This call handling could include playing prompts to the caller to take action, determining if the caller is a telephone or a facsimile machine, take a message from the caller or facsimile machine, or switching the call through to the PBX 112 by redialing the originally received DID number on lines 122 so the PBX will ring the appropriate telephone extension. Handling of the call by the MCS could also include specialized processing as described above by the applications processor 124 call flow program.

Referring now to FIG. 2, a block diagram of the internal structure of message control system 120 is illustrated. Message control system 120 is a distributive processing architecture including a voice control unit (VCU) 210, a control processor unit (CPU) 220 and line card 230. Multiple buses including a high speed voice/data bus 240, a control bus 242 and a time division multiplexed (TDM) bus are used to couple VCU 210, CPU 220 and line card 230. High speed data bus 240 is dedicated for voice and data transmission only. Control bus 242 is dedicated to command controls and system background tasks. The TDM bus 244 is used to make full duplex voice connections between individual line card ports and facsimile message controller modem channels. The CPU 220 manages the connections between line card ports and facsimile channels. VCU 210 comprises high speed processor 212 and control processor 214. VCU 210 controls the transmission of voice and facsimile data over high speed data bus 240 to and from non-volatile message storage unit 130, line card 230, and facsimile message controller (FMC) 250. VCU 210 functions as the file server, manages the system resources, and manages voice and data files and voice redundancy. VCU 210 also supports CPU 220 in providing system file access for control information including prompts and greetings. VCU 210 is also the bus controller for high speed data bus 240. VCU 210 also manages voice and facsimile data buffers and prompt cache activity. In the preferred embodiment, high speed processor 212 is a RISC customized (Reduced Instruction Set Computer) processor providing high speed data throughput. RISC processors are well-known in the art. Control processor 214 in the preferred embodiment is a Motorola 68010 processor manufactured by Motorola Corporation. It will be apparent to those skilled in the art that other processors performing a similar function may be used.

CPU 220 is responsible for interpreting and acting on DTMF control and integration information including call processing, messaging, mailbox control, message waiting notification, and class of service choices. CPU 220 receives call integration information from PBX 112 via lines 123. This integration information specifies status information concerning the call, such as the source of the call. CPU 220 manages all system call processing and messaging control commands. CPU 220 also handles many of the system background functions such as alarm notification, system polling and reporting, and modem control. The DMA controller 222 is responsible for moving large blocks of data over the control bus. The application controller 224 runs all of the main system software and handles control of messages to/from VCU 210, line card 230, applications processor 124, FMC 250, etc. The application controller 224 also controls the TDM bus controller 226. CPU 220 also includes TDM bus controller 226 which controls the operation of TDM bus 244. TDM bus 244 is to make real time voice connections between different resources of the call processing system.

Messaging control system 120 includes line card 230. Line card 230 is coupled with high speed data bus 240, control bus 242 and TDM bus 244. Message control system 120 may include a plurality of line cards similar to line card 230 and coupled to each of the three system buses as shown in FIG. 2. Line card 230 provides the interface to a plurality of telephone ports 238. Telephone ports 238 are coupled to PBX 112 via lines 122 as shown in FIGS. 1A and 1B.

Analog line card 230 includes bus controller 232 which manages control bus 242. Compressed and decompressed data unit 234 and telephone port interface unit 236 receive DTMF and voice information over telephone ports 238 and convert the information to a form compatible for transmission on high speed data bus 240 and TDM bus 244. Converted voice messages are produced by compressed and decompressed data unit 234 and transmitted on high speed data bus 240. DTMF signals are received by telephone interface unit 236 and transmitted via control bus 242 to CPU 220. Telephone interface unit 236 also provides a means for directing voice or facsimile data received on telephone ports 238 to a destination specified by information on TDM bus 244. Line card 230 manages the receipt of DTMF codes and gains control of voice signals received from telephone ports 238. Line card 230 also manages the throttling or speed control of the data transmission through high speed data bus 240. Although line card 230 is represented to convert analog data on telephone ports 238 to digital, other types of line cards may directly receive digital data at the standard rate of 64 Kbs. These cards would not have CODECS as shown to do conversion from analog to digital. Further the line card 230 may support several different kinds of signaling protocols that are well known in the art for connection to PBXs or Central Office systems. For example, Loop Start, Ground Start, E&M, ISDN, T1, E1, DID. Facsimile message controller (FMC) 250 is coupled to high speed data bus 240, control bus 242 and TDM bus 244.

In an alternative embodiment, a digital line card (DLIC) may be used in place of analog line card 230. The digital line card (DLIC) includes digital telephony interface, digital signal processing subsystem (DSPS), and a control processing subsystem. This digital line card connects to conventional digital T1 & ISDN interfaces. The DLIC connects to the high speed data bus 240, TDM bus 244, and control bus 242. The DLIC detects DTMFs and sends them over the control bus 242. It manages the flow of compressed voice data over the high speed data bus 240. The DLIC sends voice data over the TDM bus 244. The DLIC can detect fax tones on an incoming call and send a message to the CPU 220 that the incoming call is from a fax machine. This allows the CPU 220 to automatically connect the call to a FMC 20 channel and start reception of a fax message.

Referring now to FIG. 3, a block diagram of the internal structure of facsimile message controller (FMC) 305 of the present invention is illustrated. The facsimile message controller (FMC) 305 operates in conjunction with message control system 120 and applications processor 124 to provide a multi-channel facsimile data processing system. FMC 305 is coupled to message control system 120 via TDM bus interface 310, high speed bus interface 312 and control bus interface 314. FMC 305 comprises control processor (CP) 332, control processor main memory 320, image memory 324, image memory controller 332, compression/expansion processor (CEP) 326, boot read-only-memory (ROM) 330, fax processor (FP) 346, fax modem module 1 338, and fax modem module 2 340. In addition, FMC 305 includes multi-function peripheral (MFP) 328 static random access memory (SRAM) 344, back plane input/output (I/O) locations 334, TDM controller 336, and high speed bus controller 342.

Control processor (CP) 332 is the main control processor for FMC 305. The CP 332 supports the control bus interface, the fax processor (FP) 346 and the CEP 326. The CP 332 processes all commands to/from the CPU 220 in handling fax transmission. The CP 332 handles all of the T.30 protocols for fax transmission on all 8 channels. The CP 332 handles the group 3 error correction protocols. In addition, CP 332 manages the ASCII to fax conversion process. In the preferred embodiment, CP 332 is a 68HC000 processor manufactured by Motorola Corporation. It will be apparent to those skilled in the art that other processors may be used for controlling FMC 305. FP 336 is a processor which manages the transfer of data between the facsimile modems 336, 338 and 340, image memory 324, and high speed bus interface 312. The FP supports all of the T.4 protocols and end of line, end of page detect for all eight channels. In the preferred embodiment, FP 346 is also a 68HC000 processor manufactured by Motorola Corporation. CEP 326 is used to translate coded data to a facsimile image bit map and from a facsimile image bit map back to coded data. CEP 326 also detects line and page errors in received facsimile data. Image memory 324 consists of a 2 or 8 megabyte 3 port memory array. The CP 332, CEP 326, and FP 346 all can access image memory 324 through image memory controller 322. The image memory controller 322 controls the refresh of the dynamic random access memory (DRAM) of the image memory array 324. In the preferred embodiment, CEP 326 is a compression/expansion uPD72185 processor manufactured by Nippon Electric Company (NEC). Facsimile modem module 1 338 and facsimile modem module 2 340 are both 4 port modules which plug into a connector on the facsimile message controller 305 circuit board. In the preferred embodiment, there are currently two available modules: a 14.4 K baud and a 9.6 K baud version. These components of FMC 305 will now be described in detail in the following sections.

CP 332 is responsible for all upper level control of FMC 305. The CP 332 also controls the operation of multi-function peripheral (MFP) 328. MFP 328 comprises four timers and an RS-232 interface for maintenance support (not shown). CP 332 receives control information via control bus interface 314 through control processor main memory 320. A master on control bus 242, typically MCS 120 or applications processor 124, may arbitrate for use of control bus. Once control bus access is granted to a master, the master may write to a portion of control processor main memory 320 through control bus interface 314. In the preferred embodiment, a 64 K byte area of control processor main memory 320 is provided for this purpose. The CP 332 can then read the data from the shared memory and process the commands. In the preferred embodiment, control processor main memory 320 is implemented using single in-line memory modules (SIMM) either 1M byte SIMMs or 4M byte SIMMs may be used. The use of SIMMs is well-known in the art.

In addition to being able to transfer control information to or from control processor main memory 320, a control bus master may read a set of back plane I/O locations 334 through control bus interface 314. Back plane I/O locations 334 comprise a 64 K byte addressable area containing interrupt and status information with which a bus master may determine the status of facsimile message controller 305. Specifically, back plane I/O locations 334 include predefined bit locations that provide information including whether or not FMC 305 is powered up, whether or not boot ROM 330 is ready for down load, whether the FMC 305 is on-line, whether FMC 305 has been reset, whether FMC 305 requires card service, or whether the FMC 305 card has failed a power-up diagnostic test. It will be apparent to those skilled in the art that additional status information may be provided in the directly accessible back plane I/O locations 334. Referring now to FIG. 4, the memory map of the address space as seen from CP 332 is illustrated. Control processor main memory is mapped to area 410 of the address space. A 64 K shared memory area 408 or 409 is an area of CP main memory that is accessible by a control bus master through control bus interface 314. The 64 K shared memory area may be mapped to either area 408 or area 409 depending upon a bit set in I/O area 414. The remaining portions of CP main memory are used by CP 332 for processing and buffering information during the processing of commands received from a bus master.

Area 412 is an address region allocated boot ROM 330. On power-up reset of FMC 305, boot ROM 330 is mapped to address 000000 hex for four cycles thus allowing CP 332 to fetch four interrupt vectors from boot ROM 330.

I/O area 414 is a region of the address space allocated for a plurality of control and status registers within FMC 305. These FMC registers comprise three readable registers, eight writable registers and twenty-four writable latches. The readable registers start at location 500001 hex in the CP 332 memory space. The first readable register contains interrupt source information as shown in FIG. 5.

Referring now to FIG. 5, an interrupt source register format is illustrated. Interrupt source register 510 comprises 8-bits each of which correspond to a particular interrupt to which CP 332 may respond. Back plane interrupt (Bit 7) is asserted by a bus master through back plane I/O locations 334. CEP interrupt is asserted by CEP 326 when it requests service. FP interrupt is asserted by the facsimile processor 346 when it requests service. Watchdog timer time-out interrupt is a non-maskable interrupt generated when a watchdog timer expires. Parity errors can occur in image memory 324 or control processor main memory 320. Each memory has a high and a low bank (upper data byte or lower data byte). Bits 0–3 of interrupt source register 510 can be read to determine if a parity error occurred and the bank in which the parity error occurred.

The second and third of the three readable registers are the TDM registers 1 and 2, each of which correspond to one of the facsimile modem modules 338 and 340. There is a separate TDM register on each facsimile modem module 338 and 340, each of which will be read separately to obtain TDM set up information. The contents of each of these TDM registers is illustrated in FIG. 6.

Referring now to FIG. 6, the format of the TDM registers is illustrated. TDM register comprises group select bits 0 and 1. These bits select the TDM group of channels over which FMC 305 is to communicate. If the value residing in the group select bit is a 00, TDM channels 0–7 are selected. If the value in the group select bits is 01, TDM channels 8–15 are selected. If the value in the group select bit is 10, TDM channels 16–23 are selected. If the value in the group select bit is 11 (binary), TDM channels 24–31 are selected. Bus select bits 0 and 1 are used to select the TDM bus over which FMC 305 is to communicate. If the value in the bus select bit is a 00 (binary), TDM bus 4 is selected. If the value in the bus select bit is 01, TDM bus 5 is selected. If the value in the bus select bit is a 10, TDM bus 6 is selected. If the value in the bus select bits is 11, TDM bus 7 is selected. The TDM enable bit is used to enable the TDM circuitry. TDM circuitry is enabled if this bit is asserted. The TDM status bits 0 and 1 are used to determine if the TDM circuitry is operating properly. These bits are incremented module 4 when the TDM circuitry is operating properly. Thus, the TDM registers such as the one illustrated in FIG. 6 may be used to control and determine the status of the operation of a TDM bus 10.

Figure 7:
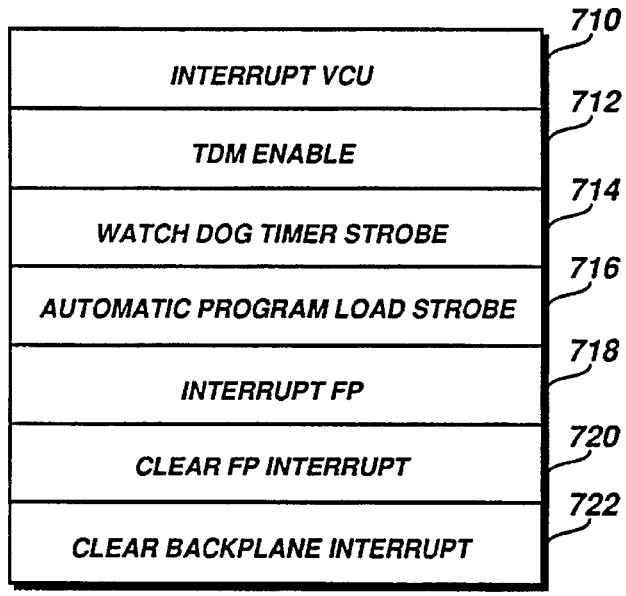
FIG. 7 illustrates the control registers that may be written by the Control Processor.

Referring again to FIG. 4, I/O area 414 comprises seven registers that may be written by CP 332. These registers include those illustrated in FIG. 7. Referring now to FIG. 7, the control registers that may be written by CP 332 are illustrated. The interrupt VCU register 710 is provided to allow CP 332 to interrupt the voice control unit 210 when a facsimile message is ready for transfer. TDM enable register 712 is used to enable the operation of the TDM bus. Watchdog timer strobe 714 is used to reset the watchdog timer. Automatic program load strobe 716 is used to trigger a program load of control processor main memory 320. Interrupt FP register 718 is used by CP 332 to trigger an interrupt of facsimile processor 346. Clear FP interrupt register 720 is used by CP 332 to clear or reset a previously set facsimile processor interrupt. Clear back plane interrupt 722 is used by CP 332 to clear a previous back plane interrupt.

Referring again to FIG. 4, I/O area 414 also contains a plurality of writable latches that are used for controlling various operations of FMC 305. These latches are illustrated in FIG. 8.

Figure 8:
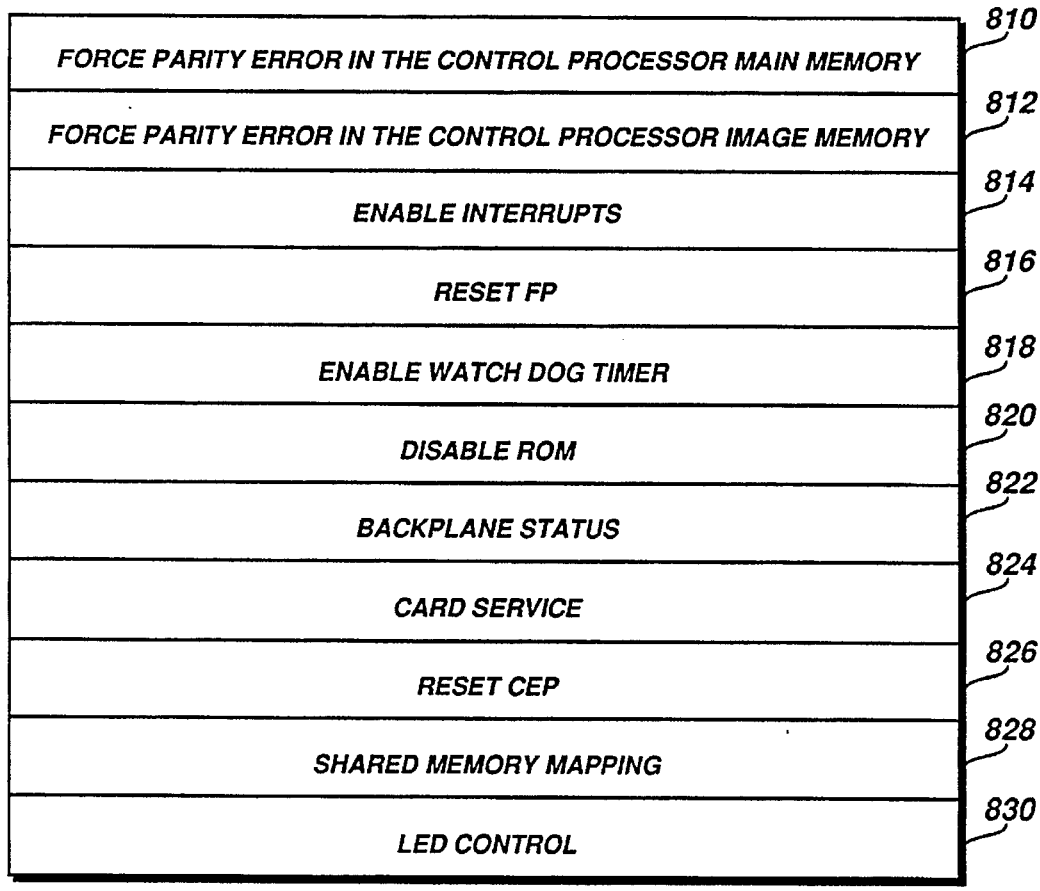
FIG. 8 illustrates the writable latches of the facsimile message controller.

Referring now to FIG. 8, the writable latches of FMC 305 are illustrated. Parity errors may be forced in either control processor main memory 320 or imaging memory 324 using latches 810 and 812. All interrupts to CP 332 may be enabled or disabled using latch 814. Facsimile processor 346 may be reset using latch 816. The watchdog timer may be enabled or disabled using latch 818. Boot ROM 330 may be enabled or disabled using latch 820. A back plane status indication may be set using latch 822. This status latch is used by FMC 305 to indicate status to message control system 120 or applications processor 124. If back plane status latch 822 carries a value 00 (binary), the FMC 305 has been reset and power-up diagnostics are in process. If back plane status latch 822 holds a value of 01 (binary), a fatal error has been detected during power-up and the FMC 305 is indicating a card failure condition. If back plane status latch 822 holds a value of 10 (binary), power-up diagnostics are complete and FMC 305 is ready for downloading. If back plane status latch 822 holds a value of 11 (binary), an on-line condition is indicated, which means if FMC 305 has been downloaded and CP 332 is operating normally. Card service latch 824 is set when an error condition has been detected or the facsimile message controller requires service. Reset CEP 826 is used to force a reset of the compression/expansion processor 326. Shared memory mapping latch 828 is used to map the shared memory area of control processor main memory 320 to a high or low area as indicated in FIG. 4. LED control latches 830 comprise a plurality of latches used to control the display of a set of LEDs on FMC 305.

CP 332 can be interrupted using five distinct interrupt types. First, a non-maskable interrupt, which is the highest priority interrupt, is used to interrupt CP 332 when the watchdog timer has expired or a parity error has occurred. The second interrupt is an interrupt generated by the multifunction peripheral (MFP) 328. The third type of interrupt is generated by facsimile processor 346. The fourth type of interrupt is generated by compression/expansion processor 326 and the last type of interrupt is generated by a back plane I/O location 334 as triggered by a bus master. All interrupts can be disabled using enable interrupt latch 814.

Referring again to FIG. 4, MFP area 416 is a portion of the address space allocated for multi-function peripheral (MFP) 328. MFP 328 comprises four timer/counters, eight bits of I/O, and an asynchronous serial port for maintenance support. One of the four timers provided by MFP 328 is a real time clock for facsimile processor 346. Another of these MFP timers is a real time clock for control processor 332. The timers are configured by software, thus allowing the FP 346 and the CP 332 to have different time periods for their respective real time clocks. Both real time clocks have means for interrupting their respective processors. In the preferred embodiment, MFP 328 is implemented using an MC68901 peripheral device manufactured by Motorola Corporation. The MFP address space 416 is provided for programmable control of these timers as well as for control of a serial input/output port provided for maintenance in the MFP 328. Means for coupling an MFP such as MFP 328 to a processor is well-known in the art.

Referring again to FIG. 4, a memory address area 418 is provided for the compression/expansion processor (CEP) 326. CEP 326 is a dedicated high speed processor that performs binary image data compression and expansion using conventional CCITT group 3 algorithms. The CEP address space 418 is provided for allocation of various control and status registers in the CEP 326. In the preferred embodiment, CEP 326 is a Nippon Electronic Company (NEC) uPD72185 compression/expansion processor which is well-known in the art.

Referring again to FIG. 4, the remaining portion 420 of the CP 332 address space is reserved for image memory 324. Image memory 324 is a relatively large portion of memory used for storage of facsimile image data. In the preferred embodiment, image memory 324 is implemented as single in-line memory modules (SIMM) which can be either 1M×9 or 4M×9 bits of random access memory. The total image memory supported is 2M or 8M. Image memory controller 322 is provided for controlling access to image memory 324 by one of four possible requestors: the facsimile processor 346, the CEP 326, CP 332, and the refresh circuitry of image memory controller 322. Facsimile processor 346 has the highest priority access for image memory 324. Refresh of the dynamic random access memory of image memory 324 is performed as a hidden refresh operation after an access cycle has completed. If no memory access requests are pending, a full refresh is performed after a predetermined time period. Control processor 332 and CEP 326 both share the lowest level priority access to image memory 324.

Figure 9:
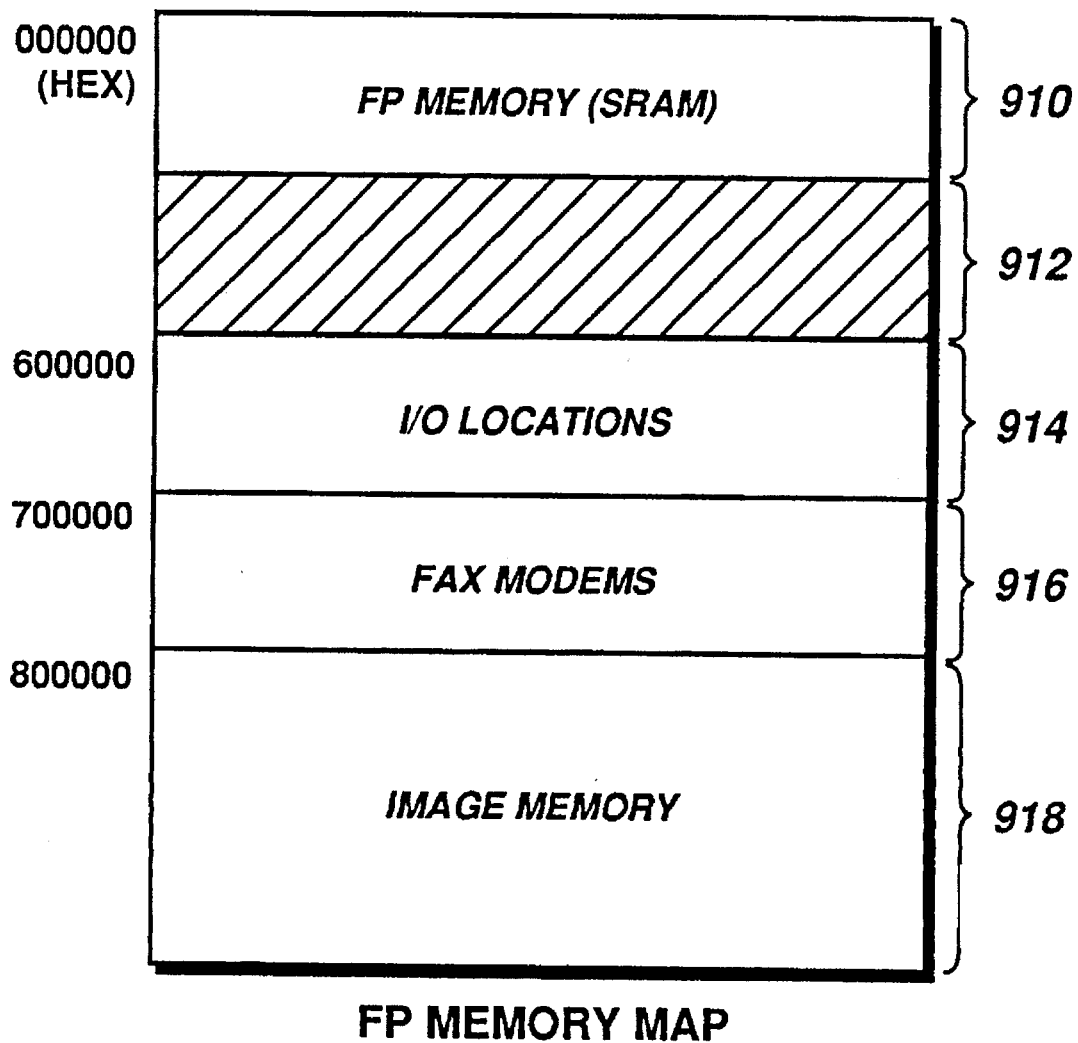
FIG. 9 illustrates the memory map for the address space accessible to the facsimile processor.

Referring now to FIG. 9, a memory map for the address space accessible to facsimile processor (FP) 346 is illustrated. FP 346 is a processor that performs all the low level hand shaking data transfers through high speed bus interface 312 and control of facsimile modem modules 338 and 340. In the preferred embodiment, FP 346 is a Motorola 68HC000 microprocessor which is available from Motorola Corporation. In the present invention, FP 346 is configured to access a different memory address space than the address space described above for CP 332. A map of the FP 346 address space is illustrated in FIG. 9. The FP memory map includes FP memory area 910 which is an address space corresponding to the memory provided by static random access memory (SRAM) 344. SRAM such as SRAM 344 is commonly available in the prior art. Address space 912 is not used in the present invention. I/O location address space 914 provides a means for accessing a plurality of control and status register provided for FP management of the facsimile modem modules and high speed interface 240. The I/O locations 914 accessible to FP 346 include a plurality of readable and writable control and status registers as illustrated in FIG. 10.

Referring now to FIG. 10, the I/O control and status registers accessible to FP 346 are illustrated. A high speed bus register file 1010 is provided.

The high speed bus register file (BRF) 1010 allows the FP 346 to read or write facsimile data to individual channels on the high speed data bus 240 using corresponding registers in BRF 101 (each register corresponds to a particular channel). The FP 346 reads or writes facsimile data to/from the VCU 210. The FP 346 writes facsimile data to individual channels that are receiving facsimile data and reads facsimile data from channels that are sending facsimile data. When all of the data that the FP 346 has stored in the BRF 1010 has been read by VCU 210, the FP is interrupted. When the FP 346 is sending data for a specific channel, the FP 346 reads the next byte of facsimile data from the BRF 1010 and sends the byte to a facsimile modem 328 or 340. The VCU 210 guarantees that the BRF 1010 always contains the next valid facsimile data byte when the FP 346 is sending facsimile data. The content of BRF 101 is detailed in FIG. 12 and described below.

High speed bus interrupt enable register 1012 provides a means for enabling or disabling interrupts from high speed bus 240. This register may be written by FP 346. In fact, all registers illustrated in FIG. 10 may be written by FP 346 with the exception of read request register 1020 and read interrupt source 1038. Register 1014 provides a means by which FP 346 may reset facsimile modems on facsimile modem module 338 and facsimile modem module 340. High speed bus request disable register 1016 provides a means by which FP 346 may disable requests made on high speed data bus 240. Enable interrupt register 1018 provides a means by which FP 346 may enable or disable all interrupts to the FP.

High speed data bus read request register 1020 is a read only register by which FP 346 may read a pending request on high speed data bus 240. Register 1022 provides a means by which FP 346 may interrupt CP 332 for service. Write request register 1024 and clear request register 1026 provide means by which facsimile processor 346 may issue a request for a service on high speed data bus 240 using write request register 1024 or clear a request for service on high speed data bus 240 using clear request 1026. Cable register 1028 and 1030 are provided for controlling facsimile modem module 338 and facsimile modem module 340, respectively.

The cable registers 1028 and 1030 allow the FP 346 to set the cable0, cable 1 inputs for each of the facsimile modems 338 and 340. The cable inputs to the facsimile modem vary the performance of the facsimile modem for differing line lengths.

Clear real time clock interrupt register 1032 provide means by which facsimile processor 346 may clear an interrupt pending from the real time clock multi-function peripheral 328. Clear CP interrupt 1034 provides a means by which facsimile processor 346 may clear a previously pending interrupt from CP 332. Clear high speed data bus area interrupt 1036 provides a means by which facsimile processor 346 may clear a previously pending error interrupt occurring on high speed data bus 240. Read interrupt source register 1038 is a read only register by which facsimile processor 346 may determine the source of an interrupt. This register is illustrated in detail in FIG. 11.

Referring now to FIG. 11, the format of read interrupt source register 1038 is illustrated. Read interrupt source register 1038 comprises refresh clock interrupt bit 1110 which is asserted when a refresh cycle of CP main memory 320 and/or image memory 324 is required. High speed data bus error interrupt bit 1112 is asserted when a high speed data bus error is detected. Control processor interrupt 1114 is asserted by CP 332 when CP 332 requires service of FP 346. High speed data bus service request 1116 is asserted when the high speed data bus 240 requires service from FP 346. When any of these interrupts occur, facsimile processor 346 will automatically be vectored to a predetermined interrupt vector address.

In addition to the interrupts illustrated in FIG. 11, facsimile processor 346 may also be interrupted by facsimile modems on facsimile modem module 338 and facsimile modem module 340. Interrupts originating from the facsimile modem do not automatically vector to an interrupt routine. Therefore, a unique interrupt vector for each modem will be placed on internal bus 360 and made available to facsimile processor 346. Thus, eight unique interrupt vectors will be generated each corresponding to one of the eight facsimile modems provided on facsimile modem modules 338 and 340.

Figure 12:
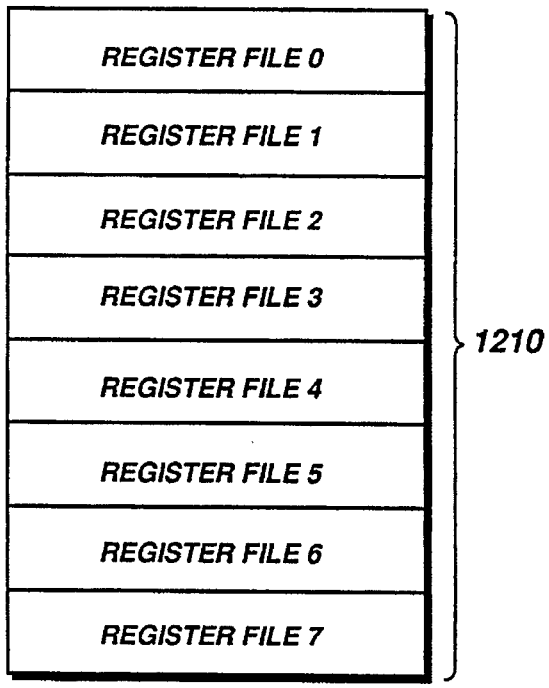
FIG. 12 illustrates the registers comprising the high speed bus register.

Referring now to FIG. 12, the registers comprising high speed bus register 1010 are illustrated. The high speed data bus 240 is a byte wide polled transfer medium for voice or facsimile data. In the preferred embodiment there are eight register files corresponding to the maximum eight ports on the facsimile message controller board 305. A channel on the high speed data bus 240 corresponds to each port. Each of these register files comprise read or write registers. These register files are illustrated in FIG. 12. Register files 0–7 provide a means by which facsimile processor 346 may store information for later transfer on any of the eight channels of high speed data bus 240 by high speed bus control 342 through high speed bus interface 312.

The protocol by which FP 346 may transfer data on high speed 240 will now be described. FP 346 uses I/O registers illustrated in FIG. 10 and the register files illustrated in FIG. 12 to initiate a high speed bus transfer. In order to initiate a high speed bus transfer, FP 346 first asserts a high speed bus request signal using a high speed request register 1016. Facsimile processor 346 then writes or reads information from a register file 1210 corresponding to the port or channel on which the data transfer is to occur. By writing or reading one of register files 1210, FP 346 sets the direction of the subsequent transfer. Transfers on high speed bus 240 can be performed in either direction on a per channel basis. FP 346 then writes to high speed data bus read request register 1020 and sets the appropriate bits corresponding to the channels on which a transfer is desired. Finally, facsimile processor 346 deasserts high speed bus request signal using high speed bus request register 1016 to allow subsequent requests on high speed data bus 240. When the high speed data bus transfer has been completed, high speed data bus service request bit 1116 is asserted. When this occurs, facsimile processor 346 is interrupted and the high speed data bus transfer is complete. By way of example, if FP 346 desires to read a byte from channel zero and write a byte to channel 3, FP 346 would perform the following steps. First, high speed bus request signal would be asserted using high speed bus request register 1016. Next, FP 346 reads a byte from register file 0 (corresponding to channel 0), and writes a byte to register file 3 (corresponding to channel 3). Next, FP 346 writes a value of 0009(hex) to write request register 1024. This operation serves to set bits 0 and 3 which correspond to data transfers on channels 0 and 3. Next facsimile processor 346 deasserts high speed request signal using high speed bus request register 1016. Finally, FP 346 waits for a high speed data bus service request interrupt 1116 when the high speed data bus transfer is complete. FP 346 cannot access register files 1210 until the high speed data bus has accessed the register files. FP 346 must wait for the high speed data bus service request interrupt 1116 before accessing register files 1210 or else an error will occur. If the high speed data bus 240 locks up, FP 346 may correct the error by asserting high speed bus request signal using high speed request register 1016.

Referring again to FIG. 3, the FMC 305 includes two facsimile modem modules: facsimile modem module 1 338 and facsimile modem module 2 340. One facsimile modem module (facsimile modem module 338) includes TDM bus controller 336. TDM bus controller 336 is the master of TDM bus signals. Both facsimile modem modules 338 and 340 each comprise four facsimile modems. In the preferred embodiment, each facsimile modem is a 9600 baud or 14.4 K baud modem manufactured by Rockwell International Corporation. It will be apparent to those skilled in the art that other types of modems or modem devices such as digital signal processors (DSP) may be used to transmit and receive facsimile data.

An MCS 120 can support multiple FMC 250 units. When more than one FMC 250 is installed in the MCS 120, the facsimile modem channels of each FMC 250 are grouped together to form a modem pool. The facsimile modem channels are then allocated out of this pool.

A call from an originating facsimile machine generates what is called a CNG tone while it is waiting for the destination facsimile machine to answer. This tone can be detected by a circuit or digital signal processing logic which is well known in the art. In the preferred embodiment, a circuit on the line card 230 of the MCS 120 or included within the facsimile modems of modem modules 338 and 340 can detect this tone. The CNG tone is used to determine that a facsimile machine (i.e. a facsimile data transmitter) is on the telephone line rather than a person (i.e. a voice transmitter). Devices that will use the CNG tone for determining if a call is for either one facsimile machine and or an associated telephone are well known in the art.

Figure 13:
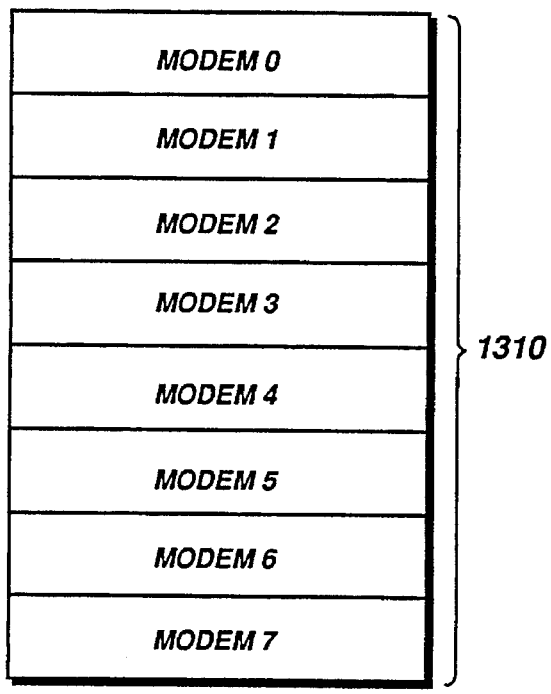
FIG. 13 illustrates the content of the facsimile modem address space.

Referring again to FIG. 9, a portion of the FP 346 address space 916 is provided for access to the facsimile modems on facsimile modules 338 and 340. FIG. 13 illustrates the content of facsimile modem address space 916.

Referring now to FIG. 13, the content of facsimile modem address space 916 is illustrated. As shown, the facsimile modem address space includes a location for each of the eight available modems in the preferred embodiment using each of these locations 1310 FP 346 may individually access the desired modem on one of the facsimile modem modules 338 or 340. In this manner, FP 346 may selectively access one of a plurality available modems and transfer information to or from that modem on the high speed bus 240. In the preferred embodiment, facsimile modem modules 338 and 340 are both daughter boards that are inserted into facsimile message controller board 305. Using this hardware architecture, any facsimile channel can be connected to any voice port. Each facsimile channel can connect to voice ports using the TDM bus 244.

Having described the hardware architecture of the present invention, the software architecture of the present invention will now be described. There are two processors on facsimile message controller board 305 that require software: control processor (CP) 332 and facsimile processor (FP) 346. CP 332 controls all the functions of facsimile message controller 305. These functions include control bus 242 interface operations, facsimile channel control, facsimile message tracing, compression/expansion processor (CEP) 326 control and data buffering, boot strap initialization operations, and ASCII to facsimile data conversion. The CP 332 also controls all of the group 3 T.30 facsimile protocol handling. This includes error correction as well. Facsimile processor 346 is a slave processor to the control processor 332. The FP 336 and CP 332 communicate with each other through a shared memory region of image memory 324. FP 346 software controls the facsimile modems, transfers facsimile data to and from the high speed bus, and implements eight channel tasks including reporting facsimile tone events received from the individual modems to CP 332.

In addition to the software on facsimile message controller 305, additional software support for the present invention is provided in VCU 210 and CPU 220 of message control system 120 and in applications processor 124. The cooperative interaction of this software for receiving and transmitting a facsimile message is illustrated in FIGS. 14A–24 and described below. Following that description, the software additions to the processing logic in applications processor 124 is described.

Referring now to FIGS. 14A–24, flowcharts illustrate the processing logic used by the preferred embodiment of the present invention. The processing logic illustrated includes call processing logic for receiving a facsimile message as illustrated beginning with FIG. 14A. Call processing logic for transmitting a facsimile message is illustrated starting in FIG. 18. A first alternative method for receiving a facsimile message is illustrated starting with FIG. 14B. A second alternative method for receiving a facsimile message is illustrated starting with FIG. 21. All of this processing logic is implemented by the call processing system illustrated in FIG. 1a. The second alternative method of receiving a facsimile message is implemented using the call processing system illustrated in FIG. 1b. The majority of this call processing logic, however, is implemented within message control system (MCS) 120.

Figure 14A:
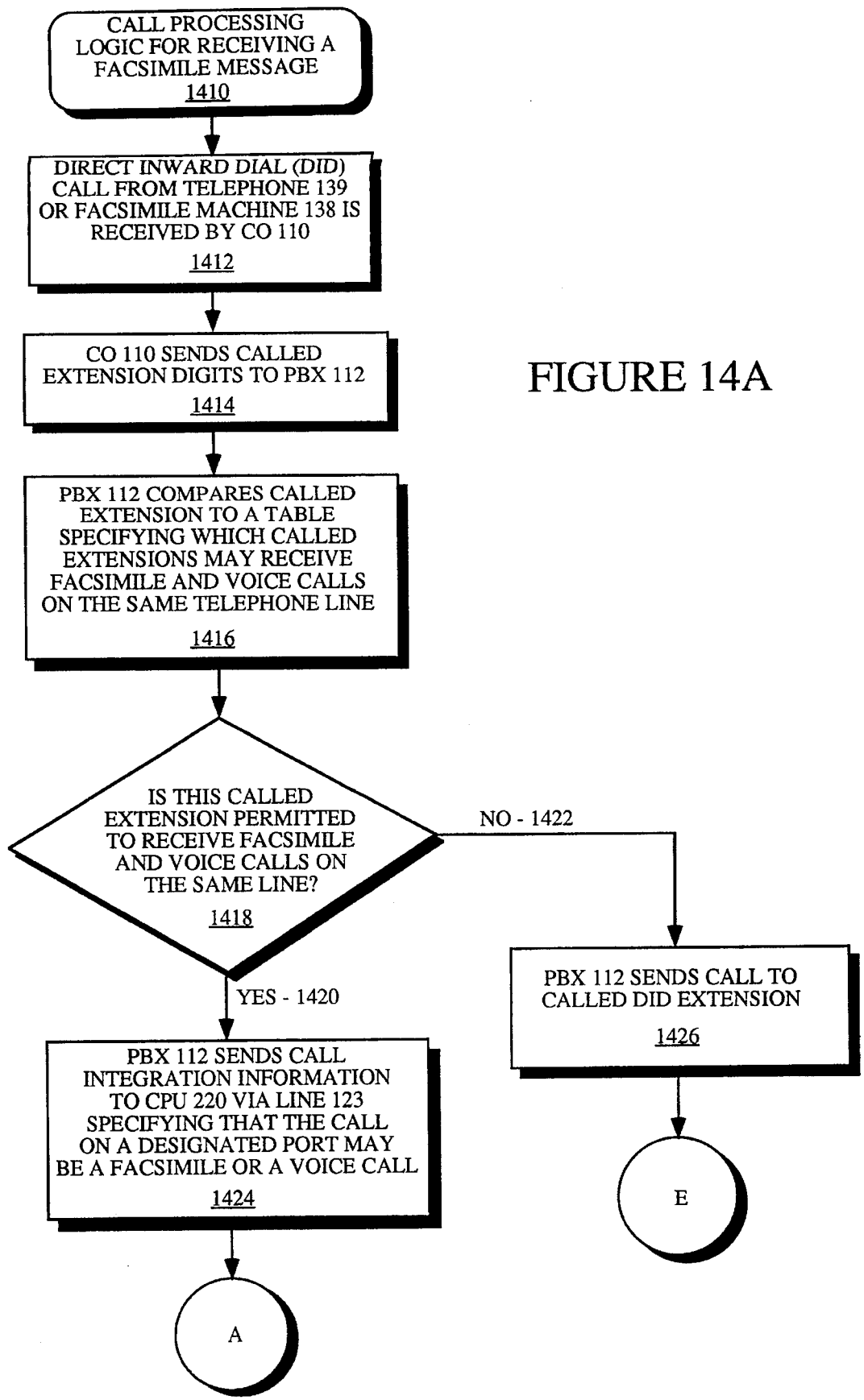
FIGS. 14A–24 are flowcharts illustrating the processing logic used in the present invention.
Figure 17A:
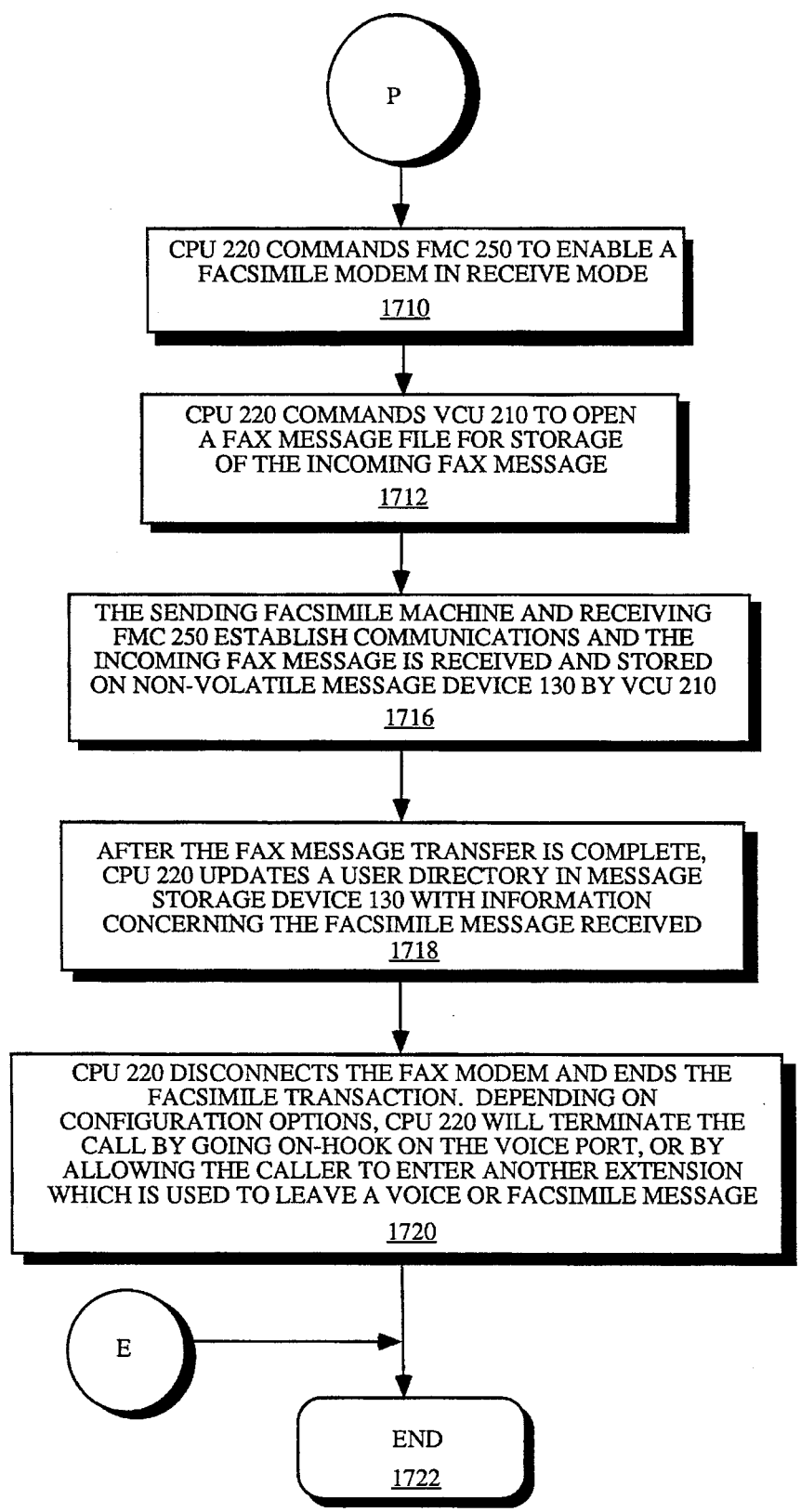

Referring now to FIG. 14A, call processing logic of the present invention for receiving a facsimile message starts at bubble 1410. Initially, an incoming call is received by central office 110. This incoming call may be a direct inward dial (DID) call from telephone 139 or an incoming call from a facsimile machine 138 as illustrated in FIG. 1a. In a conventional manner, central office 110 sends the called extension digits of the incoming call to PBX 112 (processing block 1414). One embodiment of the invention provides a table within PBX 112 for the storage of information related to each extension that PBX 112 services. This information, in one embodiment, includes a specification of which extensions may receive input voice telephone calls, which extensions may receive incoming facsimile calls and which extensions may receive both facsimile and telephone calls. It will be apparent to those skilled in the art that such a table may easily be implemented within PBX 112. In processing block 1416 as illustrated in FIG. 14A, PBX 112 compares the called extension of the incoming telephone call to the table specifying which called extensions may receive facsimile and voice telephone calls on the telephone line. If the called extension may receive voice telephone calls only, processing path 1422 is taken to processing block 1426 where the voice only call is sent to the called DID extension by PBX 112. Control then transfers to the bubble labeled E as illustrated in FIG. 17A where processing terminates at bubble 1722. Referring again to FIG. 14A, processing path 1420 is taken if the called extension may receive facsimile and voice telephone calls on the same telephone line. In this case, PBX 112 sends call and integration information to CPU 220 via line 123 (processing block 1424). This integration information specifies that the incoming telephone call on a port designated by PBX 112 may be an incoming facsimile message or an incoming voice telephone call. Processing continues at the bubble labeled A as illustrated in FIG. 15.

Figure 15:
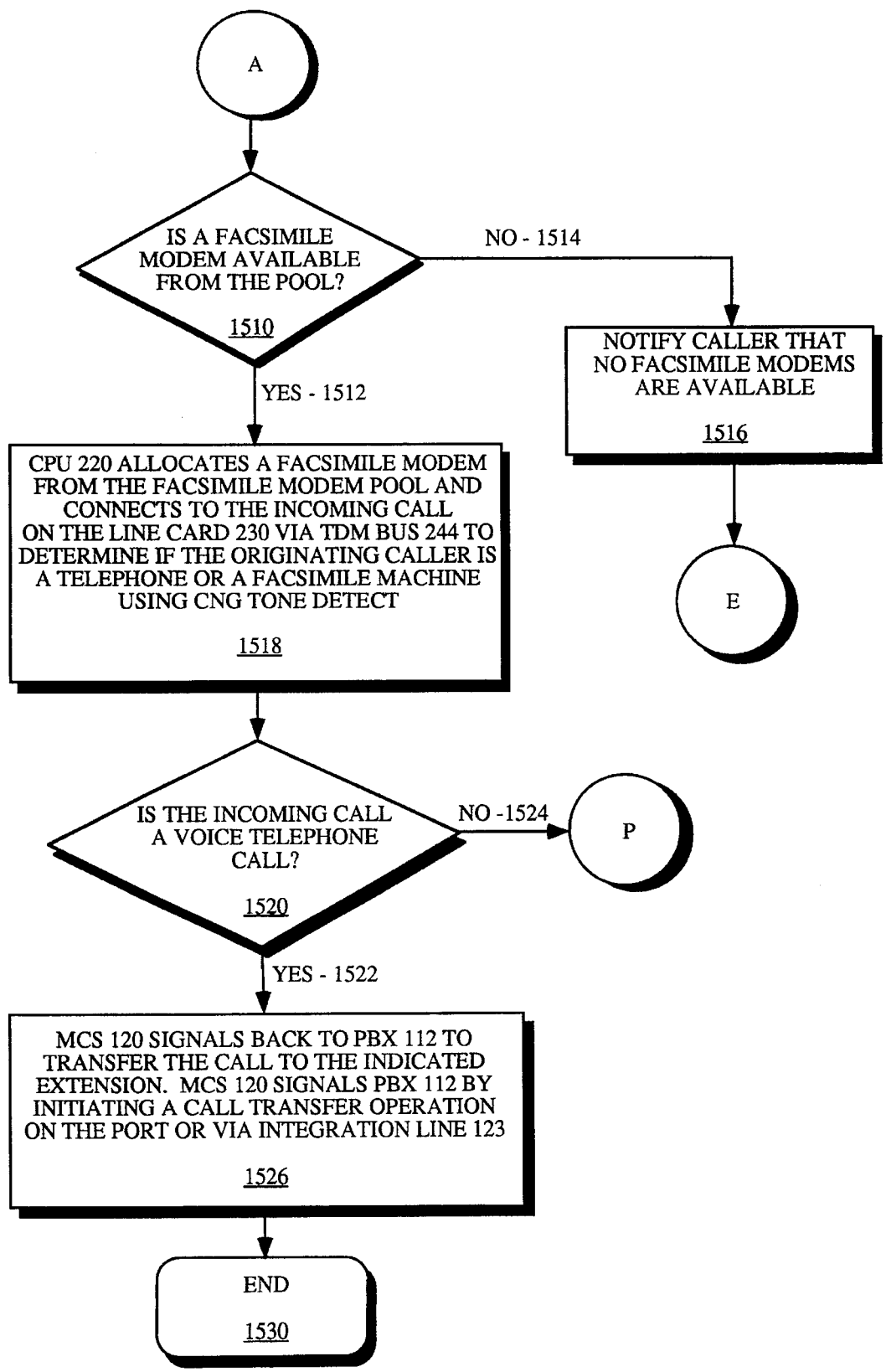

Referring now to FIG. 15, processing for receiving a facsimile message with the preferred embodiment is illustrated starting at the bubble labeled A. Upon receiving call and integration information from PBX 112 indicating that an incoming facsimile or voice telephone call has be received, message control system 120 determines if a facsimile modem is available from the facsimile modem pool in decision block 1510. If a facsimile modem is not available, processing path 1514 is taken to processing block 1516 where the caller is notified that no facsimile modems are available. Processing for the incoming call then continues at the bubble labeled E as illustrated in FIG. 17A where processing terminates at bubble 1722.

Referring again to FIG. 15, if a facsimile modem is available, processing path 1512 is taken to processing block 1518. CPU 220 controls the interconnection of the incoming call with a facsimile modem if the incoming call is a facsimile transmission. CPU 220 allocates a facsimile modem from the facsimile modem pool. CPU 220 then connects to the incoming call on line card 230 via TDM bus 244. CPU 220 connects with the incoming call in this manner to determine if the originating caller is a telephone (i.e. a voice transmitter) or a facsimile machine (i.e. a facsimile data transmitter). This determination is made using CNG tone detect as described above. If the incoming call is a voice telephone call, processing path 1522 is taken to processing block 1526 where MCS 120 signals PBX 112 to transfer the incoming call to a specified extension. MCS 120 signals PBX 112 by initiating a call transfer operation through PBX 112 or using an indication provided to PBX 112 via integration line 123. Processing for the voice telephone call then terminates at the END bubble illustrated in FIG. 15.

Referring again to decision block 1520, if the incoming call is not a voice telephone call (i.e. no CNG tone detect), processing path 1524 is taken to the bubble labeled P illustrated in FIG. 17A. Referring now to FIG. 17A, processing for the facsimile message continues at processing block 1710. CPU 220 commands facsimile message controller 250 to enable a facsimile modem of facsimile modem module 338 or facsimile modem module 340 in processing block 1710. CPU 220 commands FMC 250 using control bus 242. Any available modem within facsimile modem module 338 or facsimile modem module 340 may be enabled to receive the incoming facsimile message in a receive mode. In processing block 1712, CPU 220 commands VCU 210 to open a facsimile message file on non-volatile message storage device 130 for the storage of the incoming facsimile message. In processing block 1716, the transmitting or sending facsimile machine and the receiving facsimile message controller 250 establish communications using a conventional facsimile protocol. Facsimile header information and the incoming facsimile message is received by FMC 250 and stored on non-volatile message storage device 130 by VCU 210 via high-speed data bus 240. The facsimile header information includes an identifier (FAX Identifier) of the transmitting facsimile machine. The receipt and storage of the incoming facsimile message continues until the facsimile message transfer is complete. After the facsimile message transfer is complete, CPU 220 updates a user directory in non-volatile message storage device 130. The user directory is a set of information concerning facsimile and voice messages stored on non-volatile message storage device 130. This information in the user directory is used to identify facsimile and voice messages stored on non-volatile message storage device 130. The user directory is indexed using the extension number (i.e. telephone number) or mailbox number. In processing block 1720, CPU 220 re-initializes the message control system 120 by disabling and disconnecting the facsimile modem of facsimile modem module 338 or 340 used to receive the incoming facsimile data. CPU 220 re-initializes other system components to set up for a subsequent telephone call. Depending on configuration options set up in data structures within message control system 120, CPU 220 terminates the call by going on-hook on the voice port, or by allowing the caller to enter another extension which is used to leave a voice or facsimile message (processing block 1720). Processing for the receipt of an incoming facsimile message then terminates at bubble 1722.

Figure 14B:
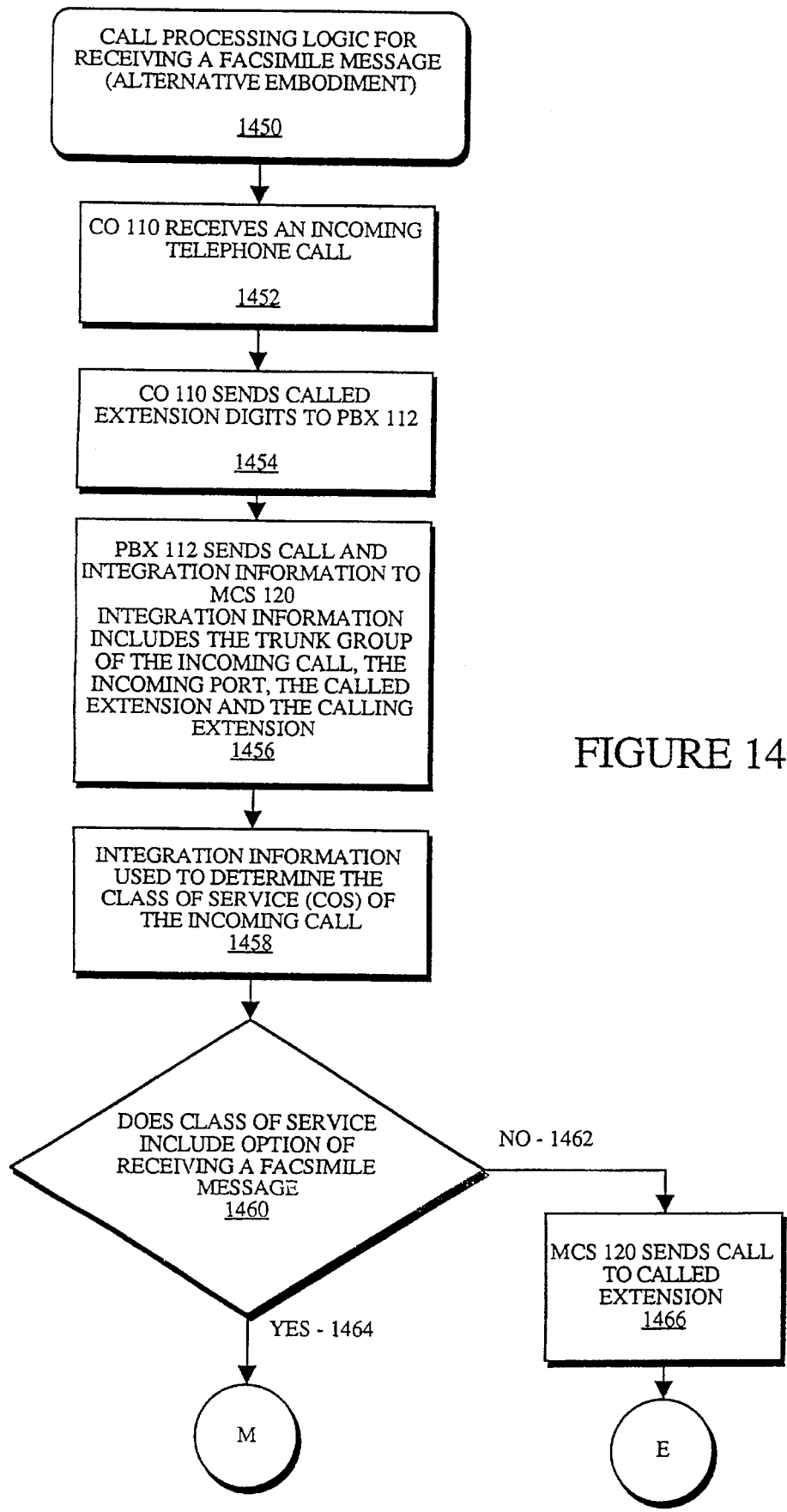

Referring now to FIG. 14B, an alternative embodiment of the processing logic for receiving a facsimile message is described. In this embodiment, a class of service (COS) is used in processing an incoming call. The incoming call is received by central office 110 (processing block 1452). The central office 110 sends the called extension digits to PBX 112 in processing block 1454. PBX 112 sends call and integration information pertaining to the incoming call to MCS 120 in processing block 1456. The integration information includes the trunk group of the incoming call, the incoming port on which the incoming call is received, the called extension number, and the calling extension number. The integration information is used to determine the class of service (COS) of the incoming call in a manner described in the co-pending patent applications cited above (processing block 1458). As described below, the classes of services supported in the present invention have been expanded to include classes of service related to facsimile processing. One or more of these classes of service specify that a particular trunk, port, or extension may be used to receive facsimile messages. If the class of service associated with the incoming call includes an option of receiving a facsimile message, processing path 1464 is taken to the bubble M illustrated in FIG. 14C. If the class of service associated with the incoming call does not include an option of receiving a facsimile message, processing path 1462 is taken to processing block 1466 where the call is routed to the called extension by MCS 120. Processing for the voice only call then terminates through bubble E illustrated in FIG. 17A.

Figure 14C:
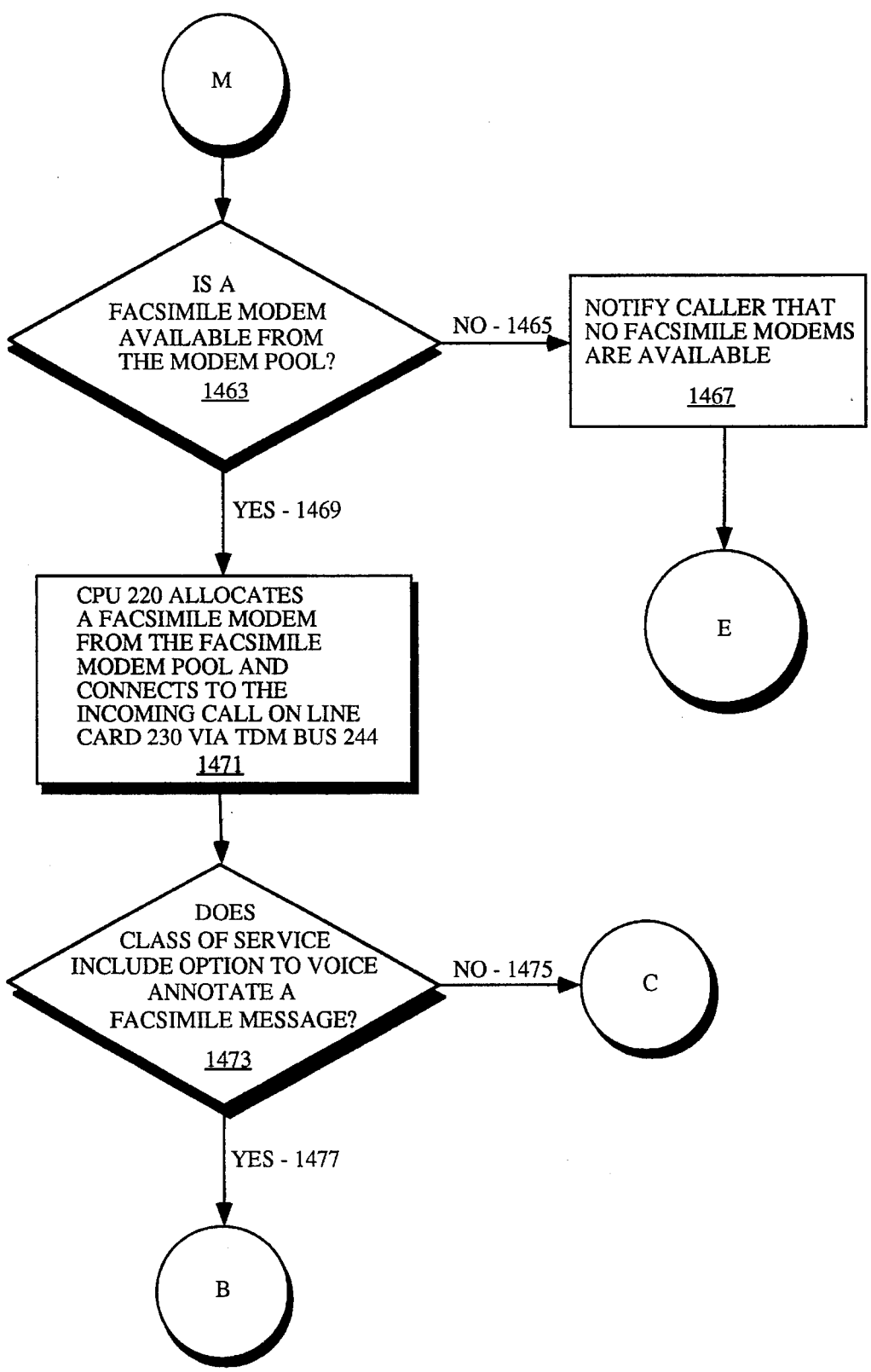

Referring to FIG. 14C, processing for the incoming facsimile message continues at bubble M. MCS 120 attempts to obtain a facsimile modem for receipt of the incoming facsimile message (decision block 1463). A modem pool on FMC 250 is accessed for this purpose. Facsimile modem module 338 and facsimile modem module 340 are included in the modem pool. If no facsimile modems are available, processing path 1465 is taken to processing block 1467 where the caller is notified that no modems are available. Processing for the call then terminates through bubble E illustrated in FIG. 17A. If a facsimile modem is available from the modem pool, processing path 1469 is taken to processing block 1471 where CPU 220 allocates a facsimile modem from the facsimile modem pool on FMC 250. CPU 220 then connects to the incoming call on line card 230 via TDM bus 244. If the class of service associated with the incoming call specifies an option of voice annotating a facsimile message, processing path 1477 is taken to bubble B illustrated in FIG. 16. Voice annotating a facsimile message includes recording and storing a voice message that is associated with a facsimile message. If the class of service associated with the incoming call specifies options not including voice annotating a facsimile message, processing path 1475 is taken to bubble C illustrated in FIG. 17B.

Figure 16:
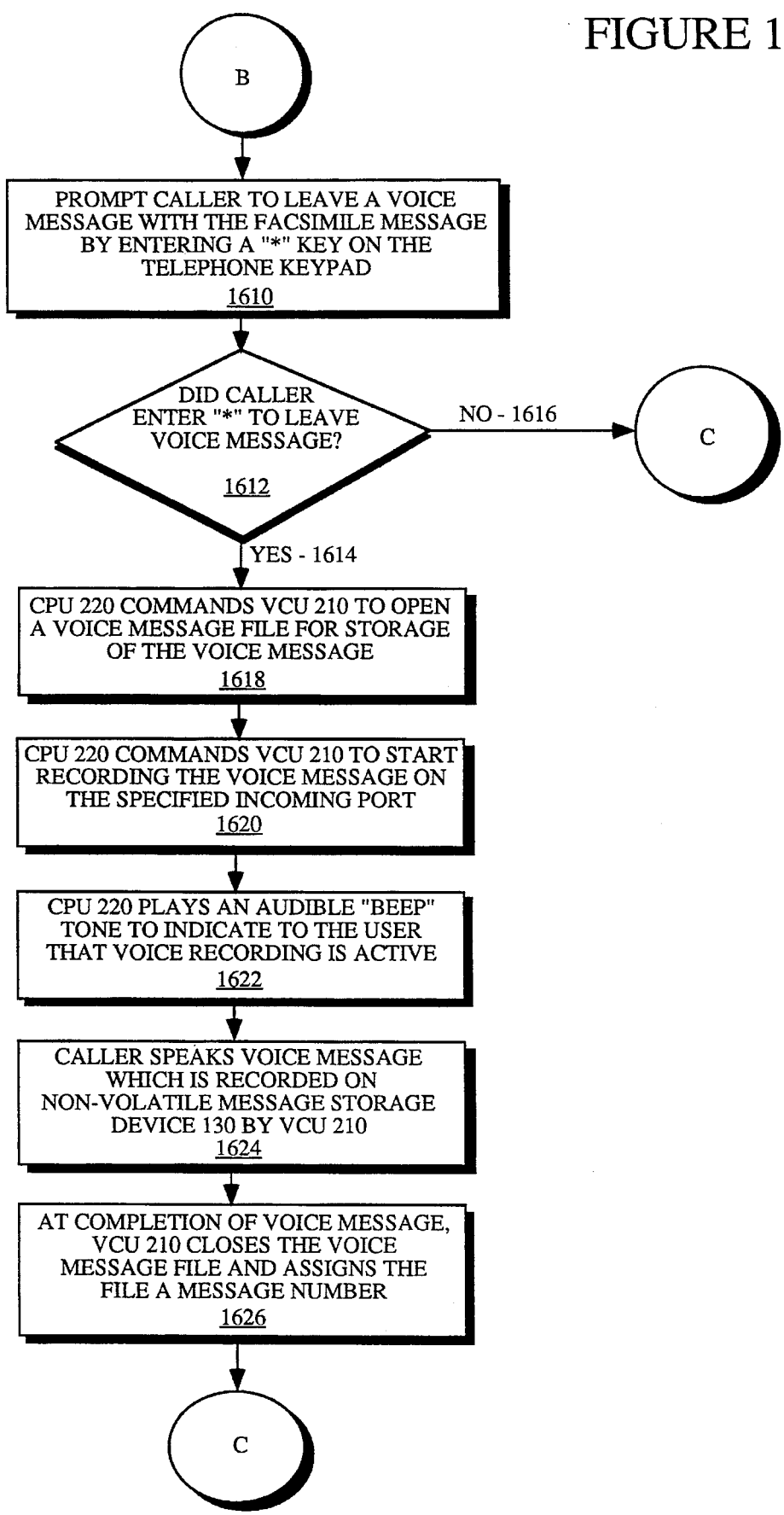

Referring now to FIG. 16, processing for voice annotating a facsimile message is described. Starting at the bubble labeled B, the caller is prompted to leave a voice message with the incoming facsimile message by entering a particular keystroke on the telephone keypad (processing block 1610). In the preferred embodiment, the particular keystroke is an asterisk "*" symbol commonly found on a standard telephone keypad. It will be apparent to those skilled in the art that other particular keystrokes or a series of keystrokes may be used to trigger the receipt of a voice message for annotating or clarifying a facsimile message.

It should be noted that the present invention receives an incoming facsimile message and optionally a voice annotation of a facsimile message all on the same incoming telephone line. In addition, prompts generated by message control system 120 using conventional voice or sound generation hardware are played or spoken to the caller over the same telephone line as the incoming message. CPU 220 is responsible for receiving and interpreting keystrokes entered on the telephone keypad. If the caller entered a particular keystroke associated with the entry of a voice message, annotation of a facsimile message (i.e., an asterisk), processing path 1614 is taken to processing block 1618. If the caller enters some other keystroke on the telephone keypad or a time-out period elapses, processing path 1616 is taken to the bubble labeled C illustrated in FIG. 17B. For a voice annotated facsimile message, processing block 1618 is executed.

In processing block 1618, CPU 220 commands voice control unit 210 to open a voice message file on non-volatile message storage device 130 for the storage of the voice message associated with the incoming facsimile message. CPU 220 then commands VCU 210 to start the recording of the voice message on the input port corresponding to the incoming telephone call (processing block 1620). CPU 220 then prompts the caller by playing an audible tone indicating to the user that voice recording is active (processing block 1622). The caller speaks a voice message over the telephone handset which is recorded on non-volatile message storage device 130 by VCU 210 (processing block 1624). Voice message recording continues for as long as the caller speaks into the telephone receiver or for a predetermined fixed length of time or until the caller enters a digit. At the completion of the voice message, VCU 210 closes the voice message file on non-volatile message storage device 130 and assigns a message number to the just recorded voice message (processing block 1626). Processing then continues at the bubble labeled C illustrated in FIG. 17B.

Figure 17B:
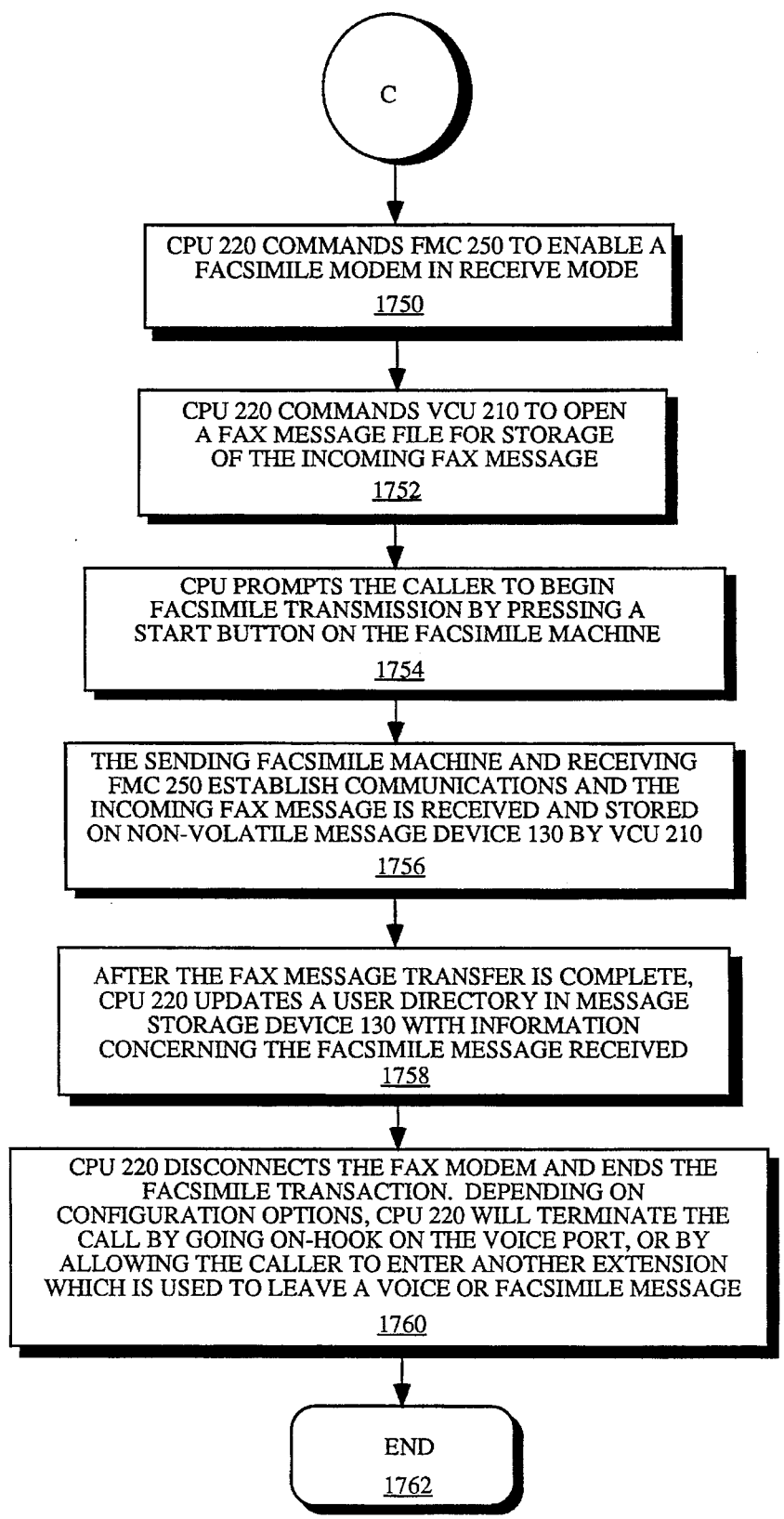

Referring now to FIG. 17B, processing for receiving a facsimile message continues at processing block 1750. CPU 220 commands facsimile message controller (FMC) 250 to enable a facsimile modem of facsimile modem module 338 or facsimile modem module 340 (processing block 1750). CPU 220 commands FMC 250 using control bus 242. Any available modem within facsimile modem module 338 or facsimile modem module 340 may be enabled to receive the incoming facsimile message in a receive mode. In processing block 1752, CPU 220 commands VCU 210 to open a facsimile message file on non-volatile message storage device 130 for the storage of the incoming facsimile message. CPU 220 then prompts the caller using a spoken voice message or a particular audible tone played on the same telephone line as the incoming facsimile message. This prompt requests the caller to initiate facsimile transmission by activating a start button on the facsimile machine at the transmission end (i.e., callers end) of the incoming telephone line (processing block 1754). At this point, the incoming telephone line ceases to be used for the transmission of voice messages and begins to be used for the transmission of facsimile data. In processing block 1756, the transmitting or sending facsimile machine and the receiving facsimile message controller 250 establish communications using a conventional facsimile protocol. Facsimile header information and the incoming facsimile message is received by FMC 250 and stored on non-volatile message storage device 130 by VCU 210 via high-speed data bus 240. The facsimile header information includes an identifier (FAX Identifier) of the transmitting facsimile machine. The receipt and storage of the incoming facsimile message continues until the facsimile message transfer is complete. After the facsimile message transfer is complete, CPU 220 updates the user directory in non-volatile message device 130 (processing block 1758). In processing block 1760, CPU 220 disables and disconnects the facsimile modem of the facsimile modem pool used to receive the incoming facsimile data. CPU 220 re-initializes other system components to set up for a subsequent telephone call. Depending on configuration options set up in data structures within message control system 120, CPU 220 terminates the call by going on-hook on the voice port, or by allowing the caller to enter another extension which is used to leave a voice or facsimile message (processing block 1760). Processing for the receipt of an incoming facsimile message then terminates at END bubble 1762.

In another embodiment of the present invention, the PBX 112 may not have a specific data base for indicating if a call is a facsimile call, but it may use its normal software to configure certain "Dummy" DID extensions to be facsimile extensions. When a call is received for a dummy extension, the call is immediately forwarded to the MCS lines 122. In this case, integration information is also sent on line 123 indicating the extension on which the incoming call was received.

In yet another embodiment, internal telephone lines 121 to which facsimile machines 137 are connected can be forwarded by the PBX 112 to the MCS lines 122 on busy and/or no answer conditions. In this case, integration information is sent on line 123 indicating the internal extension forwarded to the MCS 120.

In yet another embodiment, incoming calls on non-DID trunks to the PBX 112 on lines 114 or internal extensions associated with facsimile machines may call and be directed by the PBX 112 to immediately ring and connect to one of the MCS lines 122. In this case, the integration information in some embodiments will provide a PBX trunk group number or calling extension number indicating which type of incoming trunks the call came in on. The MCS 120 uses this information to determine how to handle the call (e.g. as automated attendant, incoming facsimile call, user logging onto their mailbox, etc.). If the PBX 112 does not provide such integration information, the ports of the MCS 120 can be grouped to handle only specific types of calls and the PBX 112 will then be set up to route to these specific ports. Refer to FIG. 14B and the corresponding detailed description for the logic for handling these cases.

Figure 18:
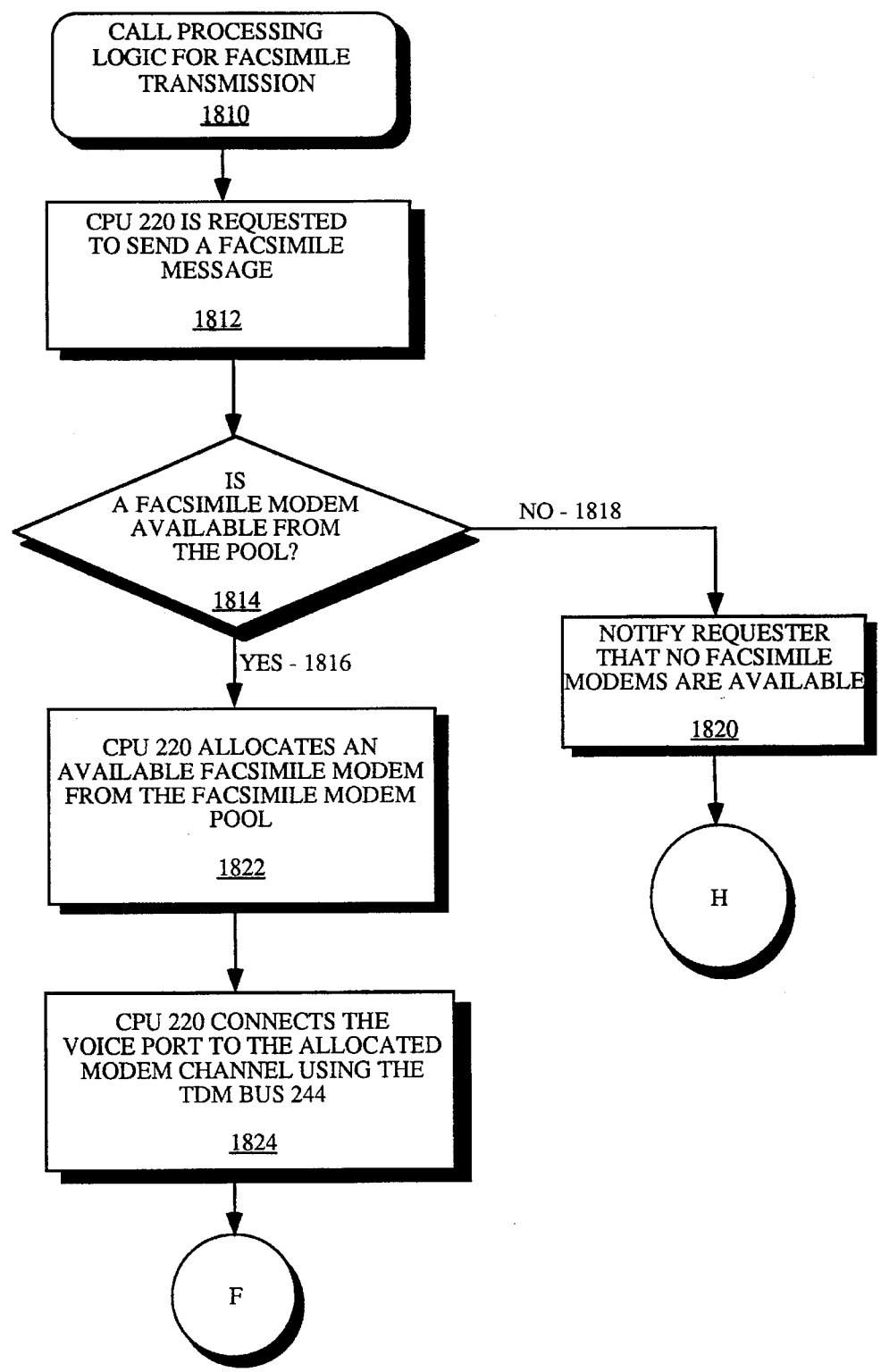

Referring now to FIG. 18, call processing logic for transmitting a facsimile message is illustrated starting at bubble 1810. Using the present invention, a caller can request that a facsimile message be transmitted on any one of telephony voice ports 238 which is already connected to a caller or the facsimile message can be sent on a different port. If the facsimile message is to be sent on a different port, the port is allocated and the appropriate number is dialed by MCS 120. Dialing a particular telephone number is technology well known in the art. Assuming a port for sending the facsimile message has been determined and is either ringing or connected to the facsimile message destination, CPU 220 is requested to send the facsimile message either by a call flow program executing in applications processor 124 or at the request of a caller by entry of a particular keystroke or series of keystrokes on a telephone keypad (processing block 1812). It will be apparent to those skilled in the art that other methods for triggering the transmission of a facsimile message are conceivable, such as the periodic transmission of a facsimile message on the expiration of a preset time-clock. Once CPU 220 receives a request to send a facsimile message, CPU 220 accesses the facsimile modem pool of facsimile message control 250 to determine if a facsimile modem is available (decision block 1814). CPU 220 accesses FMC 250 via control bus 242. If a facsimile modem is not available, processing path 1818 is taken and notification that no facsimile lines are available is sent to the requester of the facsimile transmission (processing block 1820). For example, if the request for facsimile transmission originated as a result of the entry of a particular keystroke on a telephone keypad by a caller, a voice message is spoken by conventional voice-generation hardware (not shown) thereby notifying the caller that no facsimile lines are available. Once the requester is so notified (processing block 1820), processing continues at the bubble labeled H illustrated in FIG. 20. Processing for the facsimile transmission terminates there at end bubble 2022.

Referring again to FIG. 18, processing path 1816 is taken if a facsimile modem is available. In processing block 1822, CPU 220 uses control bus 242 to allocate an available facsimile modem from the facsimile modem pool. In processing block 1824, CPU 220 connects the predetermined voice port to the allocated modem channel using TDM bus 244. By virtue of the TDM bus architecture of the present invention, any available facsimile modem of a plurality of facsimile modems in the facsimile modem pool may be selectively coupled to any available telephone voice port of telephony ports 238 on line card 230. In this manner, the transmission of a facsimile message is not restricted to a fixed facsimile modem or a fixed telephone line. Having connected a facsimile modem to an outgoing telephone line, processing continues at the bubble labeled F illustrated in FIG. 19.

Figure 19:
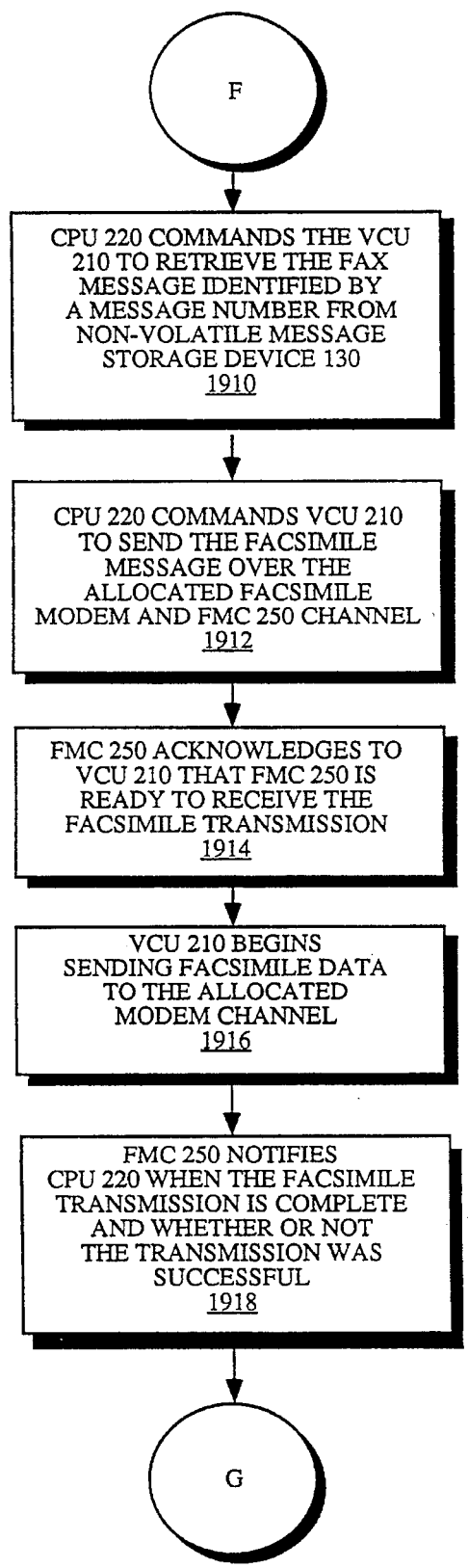

Referring now to FIG. 19, CPU 220 commands voice control unit 210 to retrieve a facsimile message for transmission from non-volatile message storage device 130. The facsimile message for transmission is identified using a message number provided by the caller or software (i.e. the requester) at the time the request for a facsimile transmission is made. In processing block 1912, CPU 220 commands VCU 210 to send the retrieved facsimile message over high-speed data bus 240 to the allocated facsimile modem using the modem channel. FMC 250 acknowledges to VCU 210 that the FMC 250 is ready to receive the facsimile transmission in processing block 1914. Once FMC 250 acknowledges that it is ready to receive facsimile data, VCU 210 begins sending facsimile data to the modem channel via high-speed bus 240 (processing block 1916). The facsimile message is sent through the allocated facsimile modem to the receiving facsimile machine over the pre-determined telephone port. This communication continues until the entire facsimile message stored on non-volatile message storage device 130 is sent through VCU 210 and FMC 250 to the receiving facsimile machine. When the entire facsimile message has been sent, FMC 250 notifies CPU 220 that the transmission has been completed (processing block 1918). In addition, FMC notifies CPU 220 if an error occurred during the transmission of the facsimile message. Processing then continues at the bubble labeled G as illustrated in FIG. 20.

Figure 20:
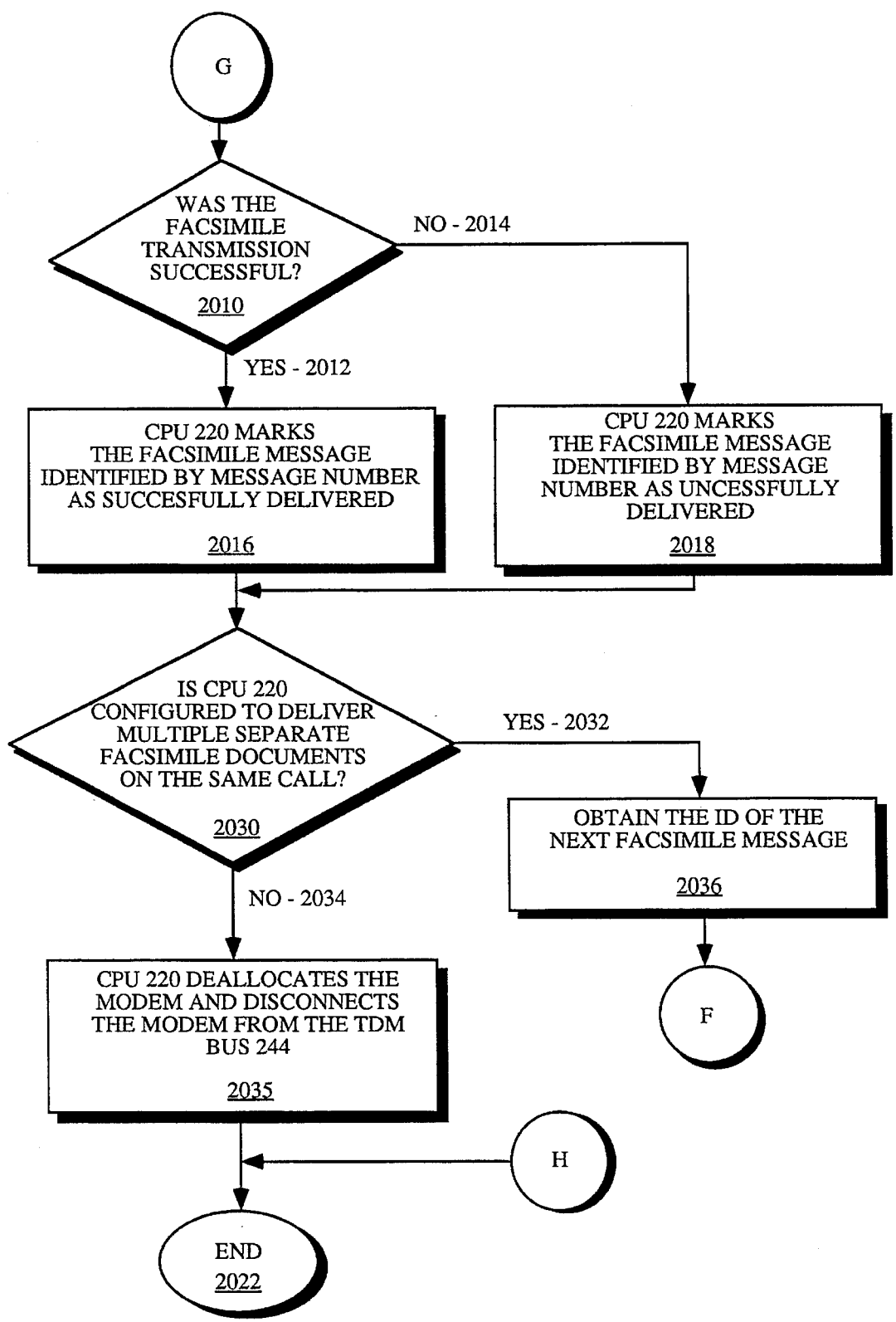

Referring now to FIG. 20, processing path 2014 is taken if the facsimile transmission was unsuccessful. In this case, CPU 220 marks the facsimile message identified by the message number as being unsuccessfully delivered (processing block 2018). The message may be so marked in a data area within non-volatile message storage device 130 or within an internal volatile data structure within CPU 220. An unseccessfully delivered facsimile message is re-sent at a later time. The number of retrys is a configured system parameter. In addition, the requester (i.e. the caller or software requesting the facsimile transmission) may be notified that an error occurred in the facsimile transmission. Call processing logic for the facsimile transmission error condition then continues at decision block 2030. It will be apparent to those of ordinary skill in the art that other methods for handling the error condition exist, such as prompting the requester to enter an alternate telephone number.

If the facsimile transmission was successful, processing path 2012 is taken to processing block 2016 where CPU 220 marks the facsimile message as being successfully delivered. The facsimile message is identified using the message number provided by the requester. Again, the facsimile message may be marked as successful by modifying a data structure within non-volatile message storage device 130 or an internal data structure of CPU 220. If CPU 220 is configured to deliver multiple facsimile messages, the message of the next facsimile message is obtained in processing block 2036 and processing continues at bubble F illustrated in FIG. 19. If CPU 220 is not configured to deliver multiple facsimile messages, CPU 220 deallocates the facsimile modem and disconnects the modem from the TDM bus 244 (processing block 2035). In this manner, the message control system 120 is ready for the transmission or receipt of a subsequent facsimile message. Call processing logic for the transmission of a facsimile message then terminates at bubble 2022 illustrated in FIG. 20.

Figure 21:
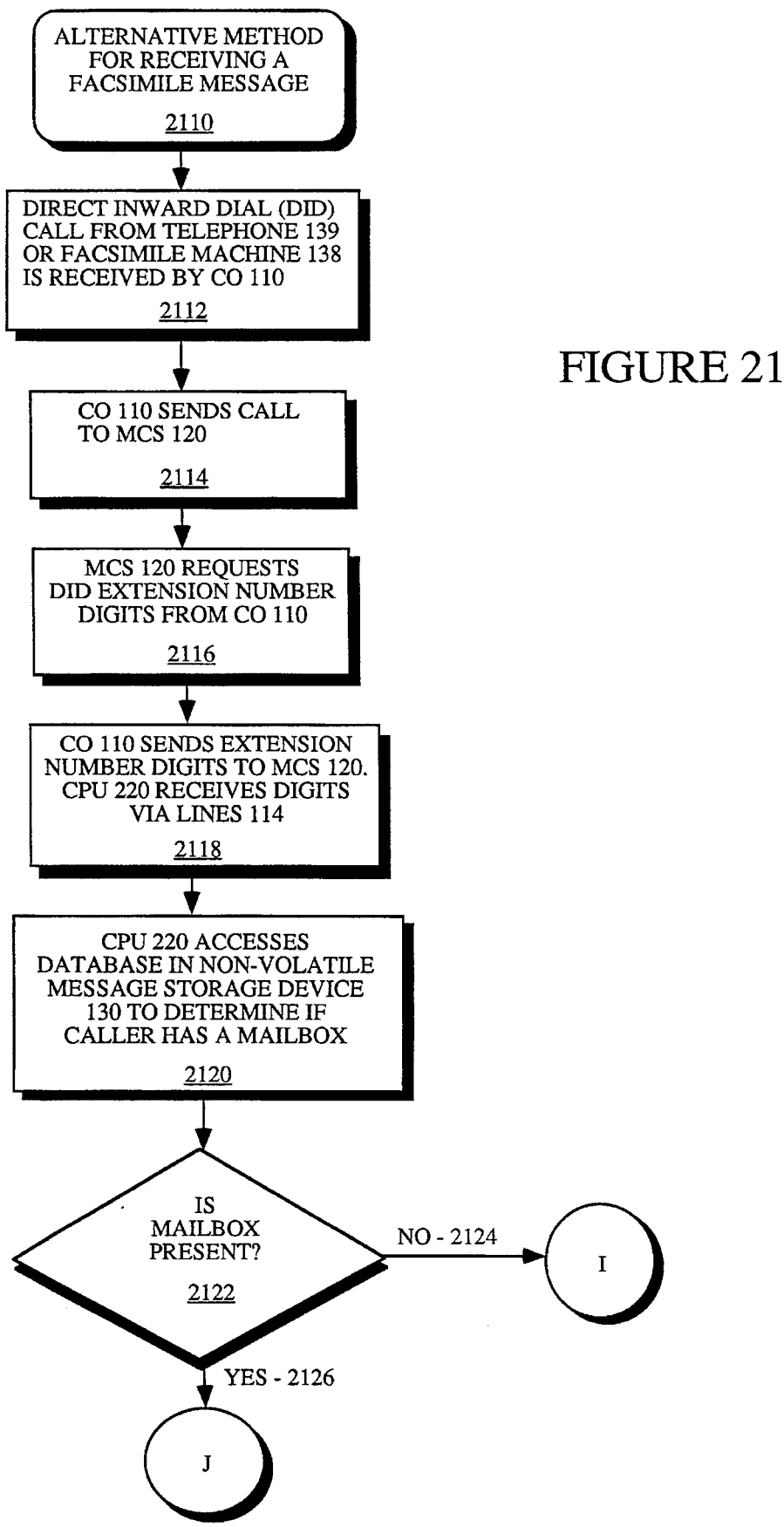

Referring now to FIGS. 21–24, an alternative method for receiving a facsimile message is illustrated. This alternative method is implemented using the alternative architecture illustrated in FIG. 1B and described above. In this configuration, message control system 120 is coupled between central office 110 and PBX 112. Referring to FIG. 21, central office 110 receives an incoming telephone call from a telephone handset (i.e. a voice call) 139 or from a facsimile machine 138 (processing block 2112). The incoming call is routed to MCS 120 via lines 114 in processing block 2114. MCS 120 requests the direct inward dial (DID) extension number digits from central office 110 in processing block 2116. Central office 110 sends the extension number digits to MCS 120 in processing block 2118. CPU 220 within MCS 120 receives the digits via lines 114. Upon receipt of the extension number digits, CPU 220 uses these digits to access a database in non-volatile message storage device 130. This database provides a correspondence between extension number and the presence of a mailbox corresponding to that extension number. The use of such a table is well-known in the art. CPU 220 accesses the database to determine if the called extension has a mailbox (processing block 2120). If a mailbox is present, processing path 2126 is taken to the bubble labeled J illustrated in FIG. 22. If, however, no mailbox for the dialed extension number is present, processing path 2124 is taken to the bubble labeled I illustrated in FIG. 23.

Figure 22:
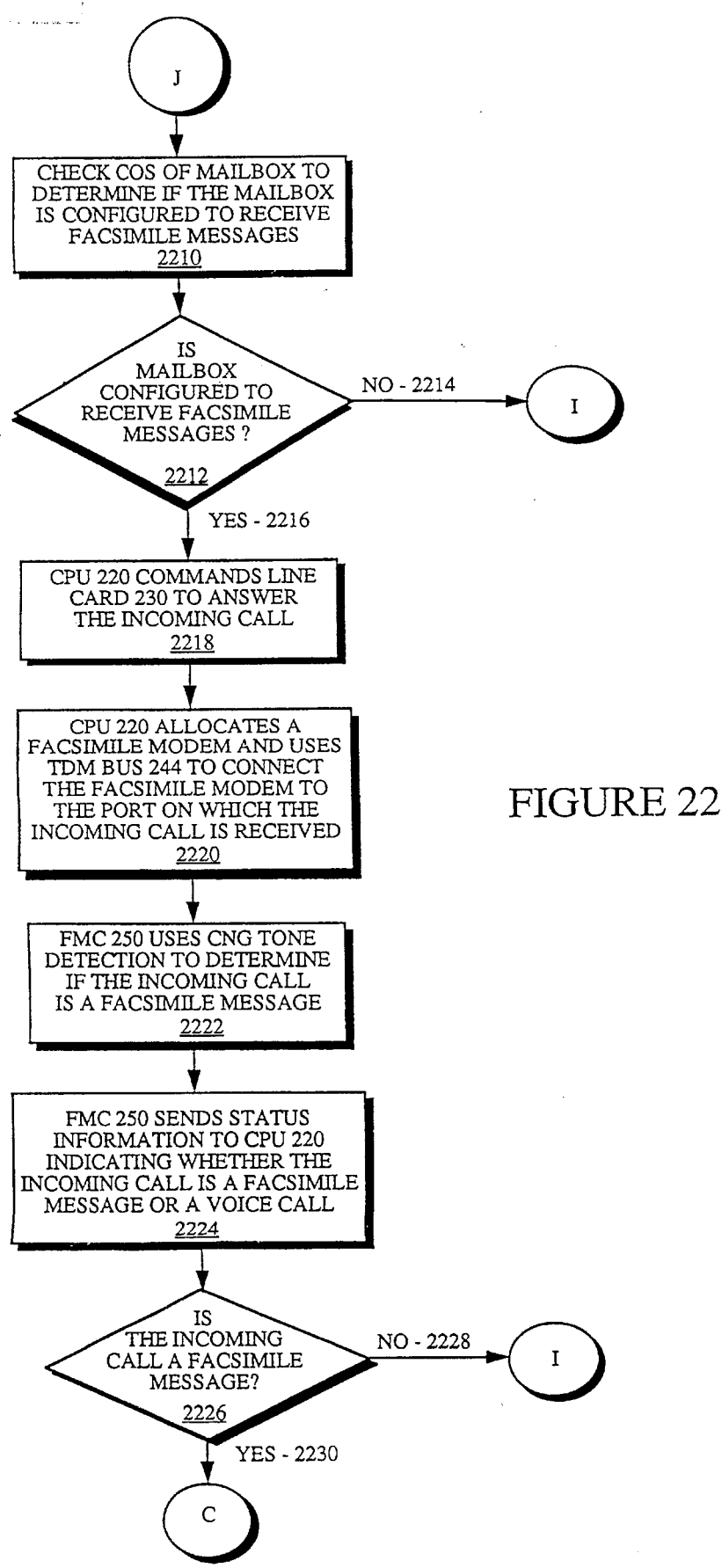

Referring now to FIG. 22, processing begins at the bubble labeled J if a mailbox exists for the incoming call. Information for each mailbox is stored in non-volatile message storage device 130. This information includes a class of service (COS) coding for each mailbox. The COS defines the type of information that may be stored in the mailbox and the type of access that may be made to the mailbox. Each of the specific classes of service supported in the preferred embodiment are described below. These classes of service include a specification of whether a particular mailbox may be configured to receive facsimile messages. On receipt of an incoming telephone call, CPU 220 accesses the class of service for the mailbox of the called extension to determine if the mailbox is configured to receive facsimile messages (processing block 2210). If the mailbox is not configured to receive facsimile messages, processing path 2214 is taken to the bubble labeled I illustrated in FIG. 23. If the mailbox is configured to receive facsimile messages, processing path 2216 is taken to processing block 2218 where CPU 220 commands line card 230 to answer the incoming telephone call. In processing block 2220, CPU 220 allocates a facsimile modem from the facsimile modem pool within FMC 250. In addition, CPU 220 uses TDM bus 244 to connect the allocated facsimile modem to the telephony port of telephony ports 238 on which the incoming call is received. FMC 250 uses CNG tone detection (described above) to determine if the incoming call is from a facsimile machine in processing block 2222. FMC 250 sends status information to CPU 220 indicating whether the incoming call is a facsimile message or a voice call in processing block 2224. If the incoming call is a facsimile message, processing path 2230 is taken to the bubble labeled C as illustrated starting in FIG. 17B and described above. If the incoming call is not a facsimile message (i.e. a voice call) processing path 2228 is taken to the bubble labeled I illustrated in FIG. 23.

Figure 23:
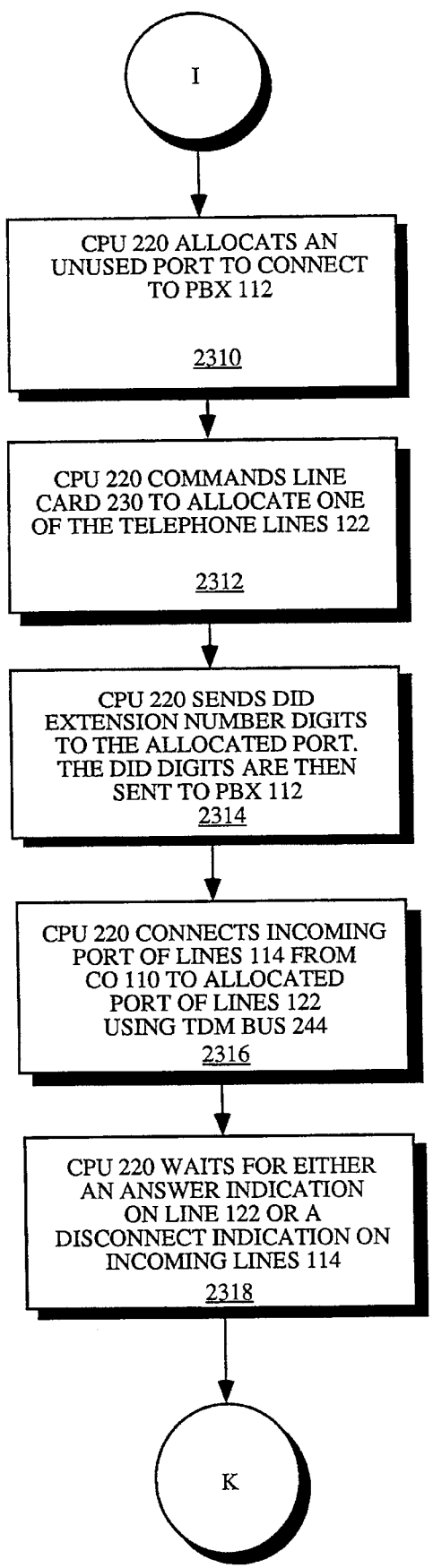

Referring now to FIG. 23, processing for a voice call using the alternative embodiment of the present invention is illustrated. CPU 220 allocates an unused port of interface 122 to connect message control system 120 with PBX 112 in processing block 2310. CPU 220 commands line card 230 to allocate one of the plurality of telephone lines 122 for the purpose of routing the incoming telephone call from MCS 120 to PBX 112 (processing block 2312). CPU 220 then sends the direct inward dial (DID) extension number digits to PBX 112 via the allocated port in processing block 2314. CPU 220 then connects the incoming port of lines 114 from central office 110 to the allocated port of lines 122 using TDM bus 244 in processing block 2316. At this point, MCS 120 has established a telephone line link for the incoming voice call from central office 110 to PBX 112. By virtue of the TDM bus architecture of the present invention, any of the available telephone lines between central office 110 and PBX 112 may be used for an incoming telephone call. In processing block 231.8, CPU 220 waits for either an answer indication on line 122 from PBX 112 or a disconnect indication on incoming lines 114 from central office 110. Processing for the incoming voice call then continues at the bubble labeled K illustrated in FIG. 24.

Figure 24:
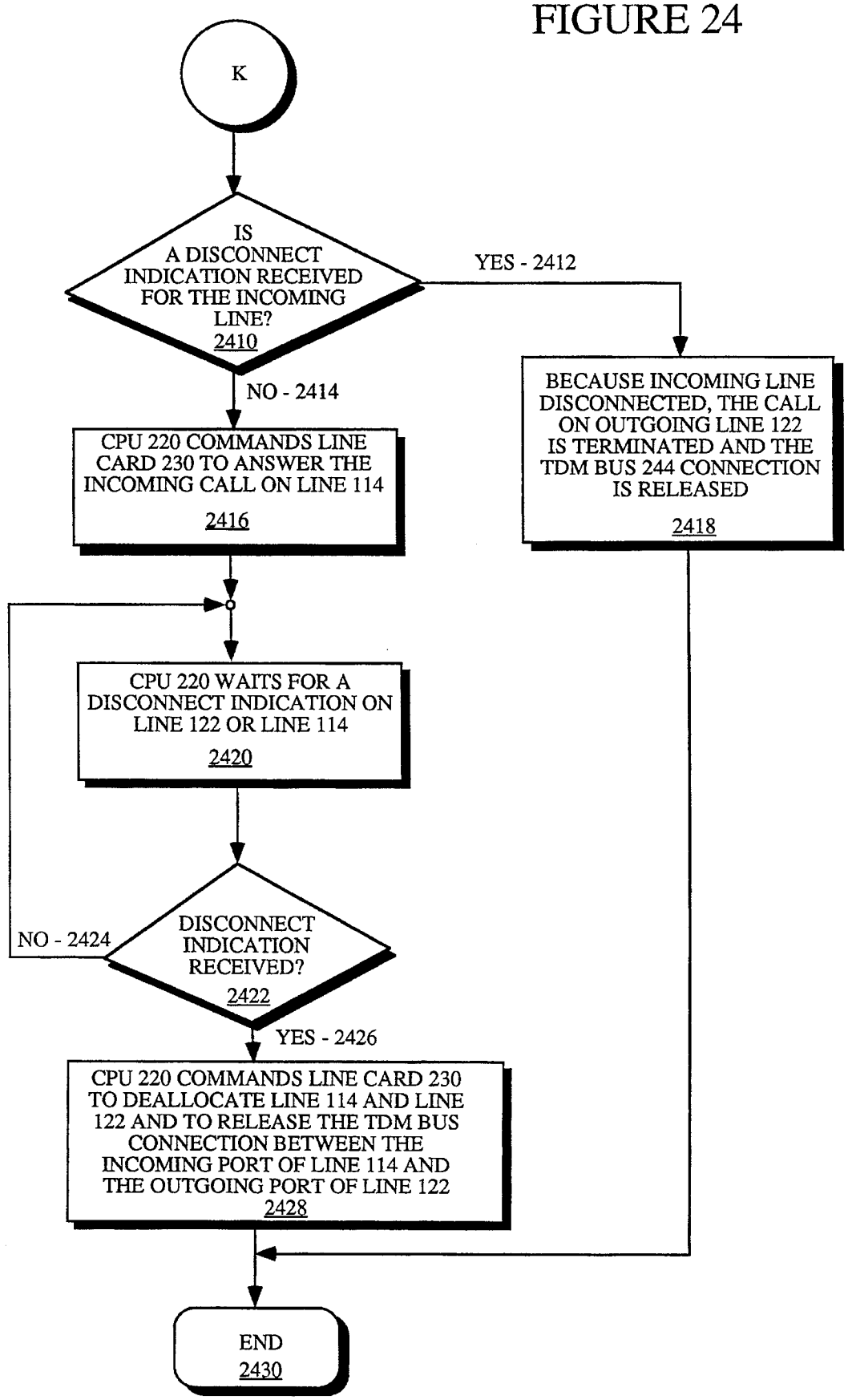

Referring now to FIG. 24, if the incoming voice call is disconnected, processing path 2412 is taken to processing block 2418 where the call on the allocated outgoing line 122 is terminated and the TDM bus 244 connection is released. Processing for the voice call then terminates at END bubble 2430.

If a disconnect indication is not received for the incoming line, processing path 2414 is taken to processing block 24 16 where CPU 220 commands line card 230 to answer the incoming call on line 114. Having established a connection between central office 110 and PBX 112, MCS 120 maintains the connection while the voice call is active. If the caller or the receiver disconnects the voice call connection, an indication is received from central office 110 or PBX 112, respectively. If a disconnect indication is received, processing path 2426 is taken to processing path 2428 where the connection between central office 110 and PBX 112 is deallocated. This connection is deallocated after CPU 220 commands line card 230 to de-allocate line 114 and line 122 and to release the TDM bus 244 connection between the incoming port of line 114 and the outgoing port of line 122. Processing for the incoming voice call then terminates at END bubble 2430. Thus, the processing logic in the preferred embodiment of the present invention and several alternative embodiments for transmitting and receiving a facsimile message is described.

A detailed description of the applications processor 124 and the associated call flow processing (without facsimile processing) is disclosed in co-pending U.S. patent application Ser. No.07/660,279, filed on Feb. 21, 1991, titled "Integrated Application Controlled Call Processing System," invented by Chencinski et al. Software in applications processor 124 is improved in the present invention to add additional call flow commands directed to the manipulation of facsimile messages. For facsimile message processing, new applications processor 124 call flow commands are supported in the present invention. These new facsimile processing commands are described in the following sections.

Several of the flow commands described below take a facsimile message identifier (FAXID) which is an identifier for the facsimile message. Facsimile messages are stored in the present invention like voice messages, except facsimile messages have a message type of facsimile. A FAXID to describe a message is just the message number of the message which is used to track the message in the system.

Several of the commands described below apply not only to facsimile processing, but also to any device that will be accessed using the TDM bus 244. The TDM bus 244 provides the ability to connect a voice port on a line card 230 to another port or channel in the system which may be connected to some device. The FMC 250 is an example of such a device, as the FMC 250 has facsimile modems resident on it. These modems may be connected to a channel to send/receive facsimile data using the TDM bus 244. Another example of a device that might use the TDM bus 244 is a text-to-speech device or other voice or sound generation device that might reside in an external computer. An application executing within applications processor 124 can connect to a device on one port, and then use the TDM bus 244 to connect a caller on another voice port to the device. The present invention can be used to establish a serial connection to the device using host connection facilities, and pass to the device a text string and a command to speak the text. A process and apparatus for speaking messages is well known and outside the scope of the present invention.

To establish a TDM connection, the present invention allocates a channel on the TDM bus 244 and then issues a connect request to connect the TDM channel between particular devices. Information transfer between the devices (such as between a voice port and a facsimile modem) may then commence. When the information transfer has been completed, the connection between devices is broken and the allocated channel is freed. The applications processor 124 flow commands to accomplish these TDM bus 244 tasks are GETCHAN, CNCTCHAN, DISCNCTCHAN, and FREECHAN. These commands are described in more detail below.

The facsimile channels available for allocation may be shared by more than one application flow executing within applications processor 124. This channel sharing capability is implemented in the present invention by creating groups of TDM channels which are managed as a unit. A channel is placed into a group for allocation using an ADDCHAN flow command. The call flows that use a particular device allocate and connect to the device using a GETCHAN and CNCTCHAN flow commands. The call flows specify which device they want to use by specifying a group name. A total of 32 channels will be managed by the preferred embodiment and each channel can be in one of 4 TDM channel groups for allocation and connection. The TDM group to use is specified in all of the TDM channel related flow commands. These commands are described in more detail below.

Facsimile capabilities added to the applications processor 124 fall into two general categories. Basic facsimile send and receive functions are implemented using two new flow commands called SENDFAX and RECVFAX. The other capability is an ASCII to facsimile format conversion function. A facsimile which has been previously stored in the present invention using the RECVFAX function can be opened for editing using an EDITFAX command. The PLACE command is then used to add text to the facsimile page, and the newly created facsimile document with the PLACEd text is saved using a MAKEFAX command. Each of these commands are described in the following sections.

ADDCHAN

If an application call flow executing on applications processor 124 establishes a connection with a server device using a voice port, and wishes to allow other call flows to connect to the server device on this port using the TDM bus 244, the application call flow must assign the channel to be shared as a member of a group. This is done using the ADDCHAN command. The application call flow specifies a group name which will be used by other application call flows to allocate a channel for connection. The preferred embodiment of the present invention manages up to 32 channels, and each channel can be in one of four groups. The groups are specified using the keyword "TDMGROUPn", where n is 1–4.

The ADDCHAN command configures a port for use over the TDM bus after the channel is allocated by another call flow using the GETCHAN command. The channel can be allocated/deallocated an indefinite number of times. The channel remains in a state where it is either idle, or allocated. Once the channel is allocated by execution of the GETCHAN command by another call flow, the channel remains in an idle state until connected using the CNCTCHAN command. The GETCHAN command makes the channel allocated but idle, and FREECHAN makes the channel available for other flows to allocate it.

The flow that executed the ADDCHAN command remains active. The flow stays on the ADDCHAN flow command and the port stays in a connected state. The flow will continue from the ADDCHAN command only after another flow issues a FREECHAN command with a RESET option.

An example of the syntax of this command follows:

ADDCHAN TDMGROUPn

The TDMGROUPn argument specifies which group the channel is placed into for later allocation. The number n must be a digit between 1 and 4 in the preferred embodiment.

GETCHAN

This flow command allocates/reserves a server channel which is used by connecting to the channel over the TDM bus 244 with the CNCTCHAN flow command. A facsimile channel must be allocated and connected before SENDFAX or RECVFAX commands can be used to perform facsimile transmission. After allocating a channel, the channel can be returned to the pool of available channels using the command FREECHAN. A channel will automatically be freed on flow termination.

The GETCHAN command takes additional arguments, which indicate whether the flow requires the facsimile channel for SEND, RECV, or EDIT functions. Any combination of these can be specified by placing the keywords after the GETCHAN FAX. These extra keywords only apply for a facsimile channel allocation.

An example of the syntax of this command follows:

GETCHAN TDMGOUPn

GETCHAN FAX [SEND, RECV, EDIT]

The TDMGROUPn argument specifies the group to use for allocation. The number n must be a digit between 1 and 4. The other form of the command allocates a facsimile channel. This command form includes at least one keyword specifying how the facsimile channel will be used; multiple usage specifiers can be used.

CNCTCHAN

This flow command connects the TDM bus 244 for a current voice channel to a TDM channel previously allocated using the GETCHAN command. A "CNCTCHAN FAX" must be executed before a call flow can send or receive facsimile messages.

The CNCTCHAN command is separated from the SENDFAX and RECVFAX commands to allow a flow program to send multiple documents to a facsimile machine in one connection. After the CNCTCHAN command is executed, no call processing type commands, such as SPEAK and INPUT, are allowed until execution of a DISCNCTCHAN command. If any fatal flow errors occur while connected, the flow will automatically execute a DISCNCTCHAN.

An example of the syntax of this command follows:

CNCTCHAN TDMGROUPn

CNCTCHAN FAX

The TDMGROUPn argument specifies the group to use for connection. The number n must be a digit between 1 and 4. The other form of the command connects a channel for transfer of facsimile messages. This command form includes a keyword specifying how the channel will be used (i.e. for facsimile message transfers).

DISCNCTCHAN

This flow command breaks the TDM bus connection between a voice channel and a TDM channel. The TDM channel is still allocated to the executing flow, and can be reconnected with another CNCTCHAN flow command.

After the DISCNCTCHAN command is executed, call processing type commands such as SPEAK and INPUT are enabled. If the TDM channel was a facsimile channel, the facsimile commands SENDFAX and RECVFAX are not allowed after execution of the DISCNCTCHAN command; because, the facsimile channel is no longer connected.

An example of the syntax of this command follows:

DISCNCTCHAN TDMGROUPn

DISCNCTCHAN FAX

The TDMGROUPn argument specifies the group to use for disconnection. The number n must be a digit between 1 and 4. The other form of the command disconnects a channel used for transfer of facsimile messages. This command form includes a keyword specifying how the channel was used (i.e. for facsimile message transfers).

FREECHAN

This flow command frees up a previously allocated channel. The channel identifier used in a FREECHAN command must match the name used in the GETCHAN call which allocated the channel.

If the flow program is freeing a channel from a user specified group (TDMGROUPn), the flow can specify whether or not the channel is reset (RESET) prior to being freed. Resetting the channel using a RESET argument completes the processing of the ADDCHAN command, so the flow that made the channel available for allocation via ADDCHAN will proceed if a RESET is specified.

An example of the syntax of this command follows:

FREECHAN TDMGROUPn [RESET]

FREECHAN FAX

The TDMGROUPn argument specifies the group to use for connection. The number n must be a digit between 1 and 4. RESET is an optional parameter, and only applies if the channel type is TDMGROUPn. The other form of the command connects a channel for transfer of facsimile messages. This command form includes a keyword specifying how the channel will be used (i.e. for facsimile message transfers).

SENDFAX

SENDFAX sends a facsimile message identified by a numeric variable (FAXID) over a currently connected voice channel (facsimile channel). The facsimile channel must already be connected to the port via CNCTCHAN FAX. After completion of the SENDFAX command, the flow will still be connected to the facsimile channel. If the flow is going to transfer multiple facsimile messages during the same connection, the flow must notify the system that there are follow-on facsimile messages to the current facsimile message. This is accomplished by adding the keyword MULTIPLE to the SENDFAX statement. This is required, because, some facsimile transmission systems must be aware immediately at the conclusion of the first message that a subsequent message is going to be transmitted. The event signal CN$FAIL will be set if the send fails, and FL$STATUS will be updated with an appropriate failure code.

An example of the syntax of this command follows:

SENDFAX FAXID [MULTIPLE]

The FAXID argument is a numeric variable uniquely identifying a particular facsimile message. The MULTIPLE argument is an optional keyword that notifies the system that more facsimile messages are to follow. If MULTIPLE is not specified, the facsimile protocol ends at the completion of the current message.

RECVFAX

This flow command is used to receive a facsimile message over a currently connected channel. The facsimile message received is uniquely identified by a facsimile message number referenced by a numeric variable. A facsimile channel must already be connected to the call flow via execution of a CNCTCHAN FAX command. After completion of the RECVFAX command, the call flow will still have the facsimile channel connected and reserved. The event signal CN$FAIL will be set if the receive fails, and FL$STATUS will be updated with an appropriate failure code.

An example of the syntax of this command follows:

RECVFAX FAXID

The argument FAXID is a numeric variable set by this command to the message number of the received facsimile message.

ERASEFAX

This flow command erases a particular facsimile message. The status parameter FL$STATUS will be updated with a result code on completion of this command.

An example of the syntax of this command follows:

ERASEFAX FAXID

The argument FAXID is a numeric variable and must contain the message number of a facsimile message.

Send Facsimile Message Example

The following is an example of an application call flow that delivers a facsimile message specified by the variable FAXID to an array of telephone numbers specified by the variable PHONENUM using the above commands. FAXID and PHONENUM variables may be initialized in a variety of ways. The flow provided below attempts to acquire a facsimile channel several times (5), delaying 5 seconds between tries. It will try to deliver each facsimile message up to 3 times before giving up.

The send facsimile message example is as follows:

```
NUM FAXID
NUM LOOPCNT
NUM CURRETRY
NUM SENDRETRY
NUM FAXRETRY
NUM I
NUM N
CHAR:20 CURPHONE
```

```
        CHAR:20 PHONENUM ARRAY 10
        NUM RETRYCNT ARRAY 10
        DEFAULT ON CN$FAIL GOTO ERROR
        " INITIALIZATION
        LET N = 10
        LET SENDRETRY = 3
        LET FAXRETRY = 5
        LET I = 1
INITLOOP:
        PUT SENDRETRY AT I USING RETRYCNT
        IF (I = N)
        THEN GOTO EXITLOOP
        LET I = I + 1
        GOTO INITLOOP
EXITLOOP:
        " GET THE FAX CHANNEL BEFORE ATTEMPTING
        CALL
        LET I = 1
GETLOOP:
        GETCHAN FAX SEND
        ON CN$FAIL GOTO CHECKCNT
        GOTO HAVEFAX
CHECKCNT:
        IF (I = FAXRETRY)
        THEN GOTO NOFAXCHN
        LET I = I + 1
        WAIT 5
        GOTO GETLOOP
NOFAXCHN:
        ENDFLOW
        " HAVE A FAX CHANNEL -- LOOP THROUGH
        PHONE #S
        " IF THE RETRY COUNT IS ALREADY 0, SKIP IT
HAVEFAX:
        LET LOOPCNT = 1
BIGLOOP:
        LET I = 1
SENDLOOP:
        GET CURRETRY AT I USING RETRYCNT
        IF (CURRETRY = 0)
        THEN GOTO NEXTI
        GET CURPHONE AT I USING PHONENUM
        CALL CURPHONE
        ON CN$FAIL GOTO DECCOUNT
        " HAVE CALLED FAX MACHINE -
        CONNECT AND SEND
        CNCTCHAN FAX
        ON CN$FAIL GOTO DECCOUNT
        SENDFAX FAXID
        ON CN$FAIL GOTO SENDFAIL
        " SEND SUCCEEDED - DISCONNECT FAX AND SET
        " RETRYCNT TO 0
        DISCNCTCHAN FAX
        PUT 0 AT I USING RETRYCNT
        GOTO NEXTI
SENDFAIL:
        DISCNCTCHAN FAX
DECCOUNT:
        LET CURRETRY = CURRETRY - 1
        PUT CURRETRY AT I USING RETRYCNT
NEXTI:
        LET I = I + 1
        IF (I <= N)
        THEN GOTO SENDLOOP
        " COMPLETED A PASS THROUGH ALL NUMBERS
        IF (LOOPCNT = SENDRETRY)
        THEN GOTO ALLDONE
        LET LOOPCNT = LOOPCNT + 1
        " COULD DELAY HERE BEFORE STARTING
        NEXT PASS
        GOTO BIGLOOP
ALLDONE:
        FREECHAN FAX
        ENDFLOW
ERROR:
        " MAY WANT TO LOG SOME INFORMATION HERE
        ENDFLOW
```

Text to FAX FLOW Commands

An existing facsimile message may be modified in the present invention by adding text to the facsimile message thereby creating a new facsimile message. This operation is accomplished in the flow language of the present invention using the EDITFAX, PLACE, and MAKEFAX commands. The EDIT command specifies an original and existing facsimile message for modification. The PLACE command is used to specify fields of information that are to be added to the original facsimile message. The MAKEFAX command generates a new facsimile message which is the original facsimile message including the additional text. This page can either be appended to a current facsimile message, or stored as a new facsimile message. A SCREEN table is used to define fields in a facsimile message. The SCREEN table is described in the above-referenced co-pending patent application. These editing commands are described in more detail below.

EDITFAX

This flow command will take an existing facsimile message identifier (FAXID) and a page number within the specified facsimile message. The command reads the corresponding page from the specified facsimile message into a facsimile message memory area of image memory 324 where the facsimile message can be edited. A facsimile channel is required to execute the command. The implementation of this command is similar to the SENDFAX command, except the specified page of the facsimile message is not transmitted over a facsimile modem. Instead, the page is constructed in the image memory 324. FL$STATUS will be updated with a result code on completion of this command.

An example of the syntax of this command follows:

EDITFAX FAXID PAGENUMBER

The argument FAXID is a numeric variable and must contain the message number of a previously stored facsimile message. The argument PAGENUMBER is a numeric constant or variable and indicates the page of the facsimile message that will be edited.

MAKEFAX

This flow command will take the current image of a facsimile message being edited in the image memory 324 and store the newly edited facsimile message. The new facsimile message can either be stored as a new message or appended to an existing facsimile message. The MAKEFAX flow command requires a numeric variable and keyword of either NEW or APPEND. If NEW message is specified, the variable will be updated with the message ID of the new message. If APPEND is specified, the variable must contain the message ID (FAXID) of an existing facsimile message. This command is similar to RECVFAX, except that the facsimile data originates from the image memory 324 instead of from the facsimile modem.

In addition, the user can add the word GRID to the MAKEFAX command. This option causes the system to automatically 'OR' in a grid pattern which can be used to find the starting locations of fields on the original facsimile message. The starting offset numbers would then be entered into a screen table definition for a facsimile page.

An example of the syntax of this command follows:

MAKEFAX FAXID {NEW, APPEND} [GRID]

The FAXID argument is a numeric variable and must contain the message number of a previously stored facsimile message, if APPEND is specified. The FAXID argument is the message number of a newly created facsimile message, if NEW is specified. GRID is an optional specifier which indicates whether to overlay a grid pattern ion the facsimile image.

Example Flow

The following flow constructs a stock transaction confirmation message which could be transferred by facsimile to a provided telephone number. This flow assumes that there is a previously stored facsimile message in the system which has the appropriate letterhead and text so the flow will only fill in the fields described below. The final letter would state This is a confirmation of your order to {buy/sell} {quantity} shams of {stockname} which was placed on {dd/mm/yy} at {hh:mm:ss}. The total amount of this transaction is {$DDD.CC}.

```
    NUM QUANTITY
    CHAR: 20 STOCKNAME
    CHAR: 4 BUYORSELL
    NUM:2 SALESPRICE
    CHAR:10 TEMP
    NUM I
    NUM STOCKCONFIRM
    NUM RETRYCNT
    CHAR:20 DELIVNUM
    DEFAULT ON CN$FAIL GOTO ERROR
    LET RETRYCNT = 5
    " GET THE FAX CHANNEL
    LET I = 1
GETFAXLP:
    GETCHAN FAX SEND, EDIT
    ON CN$FAIL GOTO CHECKCNT
    GOTO HAVEFAX
CHECKCNT:
    IF (I = RETRYCNT)
    THEN GOTO NOFAXCHN
    LET I = I + 1
    WAIT 5
    GOTO GETFAXLP
NOFAXCHN:
    ENDFLOW
HAVEFAX:
    " GET THE FAX COVERSHEET NUMBER
    FOR EDITING FROM
DATABASE
    FIND FIRST RECORD WITH RECORD =
    'STOCKCOVER'
    USING FAXCOVERS
        GET STOCKCONFIRM AT FAXNUMBER USING
        FAXCOVERS
        EDITFAX STOCKCONFIRM 1
        ON CN$FAIL GOTO EDITERR
        PLACE BUYORSELL AT TYPEBS ON STOCKCOVER
        LET TEMP = MAKENUM QUANTITY
        PLACE TEMP AT QUAN ON STOCKCOVER
        PLACE STOCKNAME AT NAME ON STOCKCOVER
        LET TEMP = SY$DATE
        PLACE TEMP AT ORDDATE ON STOCKCOVER
        LET TEMP = SY$TIME
        PLACE TEMP AT ORDTIME ON STOCKCOVER
        LET TEMP = MAKENUM SALESPRICE
        LET TEMP = '$' CONCAT TEMP
        PLACE TEMP AT ORDTOTAL ON STOCKCOVER
        MAKEFAX NEWFAXID NEW
        ON CN$FAIL GOTO MAKEERR
        " DONE BUILDING FAX - NOW SEND IT
        CALL DELIVNUM
        ON CN$FAIL GOTO CALLERR
        CNCTCHAN FAX
        SENDFAX NEWFAXID
        ON CN$FAIL GOTO SENDERR
        " ALL IS OK -- ENDFLOW DOES ALL CLEANUP
        ENDFLOW
        " SPECIFIC ERROR HANDLERS
EDITERR:
MAKEERR:
CALLERR:
SENDERR:
ERROR:
    ENDFLOW
```

In addition to the new applications processor flow commands specified above, four new class of service (COS) attributes are added to support facsimile processing in the call processing system of the present invention. These class of service attributes are maintained as data values corresponding to each mailbox and stored on non-volatile message storage device 130. Specifically, these new class of service attributes are as follows:

1. COS attribute 82—(FAX)

This COS attribute is assigned to a mailbox. This attribute gives the mailbox printing capabilities. A facsimile message cannot be sent to a mailbox unless it has the FAX COS.

2. COS attribute 83—(INFAX)

This COS attribute can be assigned to either a port/trunk or a mailbox. The port and/or the trunk of an incoming call is determined using call and integration information provided to MCS 120 on line 123. When this COS is assigned to a port/trunk, a caller on this port/trunk is given the option to leave a facsimile message when the caller dials a mailbox with the FAX COS. If the caller enters a mailbox number corresponding to a mailbox previously configured without the FAX COS, the caller is given normal automated attendant or voice message options.

A caller who directly dials a mailbox with both the INFAX and FAX COS attributes is also given the option to leave a facsimile message.

3. COS attribute 84—(OUTFAX)

This COS attribute is assigned to a mailbox. When a mailbox with this COS is called, the present invention automatically plays the first facsimile message stored in the mailbox. This COS can be used for Fax-On-Demand operations.

4. COS attribute 85—Phantom mailbox

When this COS attribute is assigned to a mailbox, all messages that are received by the phantom mailbox are actually placed in the mailbox defined by the extension number of the phantom mailbox. For example, a phantom mailbox 4001 with 1234 defined as its extension number would not be used for storage of an incoming message. Instead, all messages addressed to mailbox 4001 would be placed in mailbox 1234. When a user logs onto mailbox 1234 and listens to messages, he/she would not be able to distinguish if the message was originally addressed to mailbox 4001 or mailbox 1234.

Using these newly defined class of service attributes for facsimile processing, there are five methods that a caller can use to send a facsimile message to a facsimile mailbox. These methods include:

1. Call in on a port/trunk with the INFAX COS and dial a mailbox with the FAX COS.

2. Call a mailbox with the INFAX and FAX COS attributes.

3. Use the quick facsimile feature (**) and directly address a facsimile message to a mailbox with the FAX COS.

4. Logon and forward a facsimile message from one facsimile mailbox to another.

5. Forward from an extension with the INFAX COS service. Forwarding information is passed over integration link 123.

In order to route a facsimile message to a mailbox, it is necessary to determine if an incoming call is a facsimile call. The MCS 120 has several methods of determining that an incoming call is a facsimile call and requires the reception of facsimile data. These methods include the following.

1. The specific MCS 120 voice port that receives a call may have the INFAX class of service. This will cause the CPU 220 to automatically connect a FMC 250 channel to the port. The reception process follows the flow charts illustrated in FIGS. 14A–17B.

2. The source of an external call and the trunk group number, may have the INFAX class of service. This allows all of the MCS 120 ports to be configured in the same hunt group from the PBX 112. The MCS 120 will only connect an FMC 250 channel on the voice port when the trunk group number received from the PBX 112 integration for the incoming call has the INFAX class of service configured in the MCS 120.

3. The caller may call into the MCS 120 on a standard port. The caller may then enter an extension number which has the INFAX class of service.

4. The caller may be forwarded into the MCS 120 from an extension that has the INFAX class of service.

5. The caller may call into the MCS 120 and enter a keypad sequence such as the following: ext#. The asterisk characters () indicate that the MCS 120 should process the call as a facsimile message call. The MCS 120 connects an FMC 250 channel to the voice port corresponding to the entered extension number (ext#). In the preferred embodiment, this operation is called the quick facsimile feature.

6. The sending group 3 facsimile machine sends out an alternating CNG tone. This tone cadence is typically 500 ms on and 3 sec off. This is well known the art. The receiving portion of the MCS 120, if it is a digital line card, can detect this tone cadence and send a message to the CPU 220. The CPU 220 will connect an FMC 250 channel to the voice port and start to receive a facsimile message. If the receiving port is an analog port (i.e., on an analog line card), the CPU 220 will immediately connect an FMC 250 channel to the voice port over the TDM bus 244. The FMC 250 channel will monitor for a CNG tone cadence. If the CNG tone cadence is present, the CPU 220 will start receiving the facsimile data. If the CNG tone cadence is not present, the CPU 220 will disconnect the FMC 250 channel and proceed with conventional voice call processing.

The following section uses several examples to describe the operation of the present invention in its preferred embodiment. The examples presented below are implemented using the hardware and software of the present invention as described above.

EXAMPLE #1

A caller who's call is routed in to MCS 120 on a port with the INFAX COS selects a mailbox with the FAX COS. A mailbox is selected in the preferred embodiment by dialing a sequence of digits on the telephone keypad. Once a mailbox is selected, the caller is asked to leave a facsimile message instead of a voice message. Alternatively, the INFAX COS can be assigned to a trunk group instead of a port. If the mailbox selected does not have the FAX COS, the system acts like a conventional automated attendant (the caller is only given the option to leave a voice message). If the application requires that the caller be given the option to leave a lo facsimile message immediately without dialing the mailbox number, the next mailbox in a port/trunk Information Table can be set up with the FAX COS. The port/trunk Information Table is described in co-pending U.S. patent application Ser. No.07/660,279, filed on Feb. 21, 1991, titled "Integrated Application Controlled Call Processing System," invented by Chencinski et al.

The sequence of events in this first example is as follows.

| caller: | Calls in on a port of a trunk group with the INFAX COS assigned. |
|---|---|
| caller dials: | [1234] a mailbox with FAX COS. The system accesses tables to determine the name of the person associated with the dialed mailbox. |
| system speaks: | "Joe User" using voice generation equipment. "To leave a voice message with your facsimile message press star, or wait for facsimile tone" |
| caller dials: | [*] the star or asterisk key on the telephone keypad. |
| system speaks: | "Please record your voice message, to end recording press pound . . . beep" |
| caller: | Speaks voice message and then dials [#] the pound key on the telephone keypad. |
| system speaks: | "Please start facsimile transfer now" |
| system: | Sends facsimile tone and records facsimile data. |
| system speaks: | "Thank you for your message" "You may now dial another extension number, or dial zero for assistance" |

EXAMPLE #2

A caller that selects a mailbox with both the INFAX and FAX COS assigned is asked to leave a facsimile message instead of a voice message. In addition, a caller in an integrated system that forwards a call in from a mailbox with the INFAX and FAX COS is also given the option to leave the facsimile message. This capability can be used to hard forward DID numbers directly into the system to leave facsimile messages without having to dedicate ports or trunks for this purpose.

The sequence of events in this second example is as follows.

| caller dials: | [1234] a mailbox with FAX COS or forwards in from mailbox 1234. |
|---|---|
| system speaks: | "Joe User" "To leave a voice message with your facsimile press star, or wait for facsimile tone." |
| caller dials: | [*] |
| system speaks: | "Please record your voice message, to end recording, press pound" |
| caller: | Speaks voice message and then dials |
| system speaks: | "Please start facsimile transfer now" |
| system | Sends facsimile tone and records facsimile data. |
| system speaks: | "Thank you for your message" "You may now dial another extension number, or dial zero for assistance" |

EXAMPLE #3

A caller can also send a facsimile message immediately by accessing a quick facsimile function activated using the keypad sequence (**) in the preferred embodiment. This function is activated by depressing the asterisk or star key "*" on the telephone keypad twice in succession. If the mailbox addressed has the FAX COS, the caller is immediately asked to leave a facsimile message.

The sequence of events in this third example is as follows.

| caller dials: | [**1234] a mailbox with FAX COS. |
|---|---|
| system speaks: | "Joe User" "To leave a voice message with your facsimile message press star, or wait for facsimile tone." |
| caller: | Does nothing and the system times out after a pre-determined time-out period. |
| system speaks: | "Please start facsimile transfer now." |
| system: | Sends facsimile tone and records facsimile data. |
| system speaks: | "Thank you for your message." "You may now dial another extension number, or dial zero for assistance" |

EXAMPLE #4

A user can forward a facsimile message by logging onto their mailbox and forwarding the facsimile to another mailbox. The function of logging onto a mailbox is well known in the art. The function of forwarding a facsimile message from one mailbox to another mailbox is uniquely part of the present invention.

As also illustrated in this example, a user can access and listen to facsimile message header information. This information includes the following types of facsimile message related information:

1. a voice annotation message recorded by a caller which explains or comments upon a facsimile message.
2. Print status of the facsimile message or instructions on how to print the message.
3. The number of facsimile pages received.
4. The ID of the sending facsimile machine.
5. The state of the facsimile message. The states are described below.
6. The date and time the facsimile message was received.

A facsimile message can exist in the following states: un-marked, marked for delivery, successfully delivered, or unsuccessfully delivered. In the un-marked state, a new facsimile message has been received but has yet to be marked for delivery. When a facsimile message is in the un-marked state, the status of the message is not spoken to the user. Instead the user is prompted to select various options for delivering the message. In the marked for delivery state, a facsimile message is marked to be printed at either the group facsimile delivery number or a personal facsimile delivery number. When a facsimile message is received into a mailbox configured with auto-print, the state of the incoming facsimile message is initially set to "marked for delivery." A facsimile message marked as successfully delivered was successfully printed. The facsimile message remains in the mailbox after a successful print. A facsimile message marked as unsuccessfully delivered could not be printed at the designated destination. The failed destination is spoken in the print status. A facsimile message is not deleted unless the message has been explicitly erased or successfully printed and the mailbox in which the message resides is configured with an auto-delete option.

The sequence of events in this fourth example is as follows.

| user: | Logs on to a mailbox . |
|---|---|
| system speaks: | "You have 2 Urgent messages, 3 Facsimile messages, 4 new messages, and 5 saved messages." |
| user: | Presses [5] to listen to a facsimile message header. |
| system speaks: | "Facsimile message." {the system then speaks the voice annotation message corresponding to the facsimile message, if there is any.} {the system then speaks the print status of the facsimile message. The print status is one of the following: "marked for delivery", "delivery successful", or "delivery failed". For a newly received facsimile message, the system speaks, "For print options, press one nine eight."} "Three pages received from 5 5 5 1 2 1 2. {If an error occurred, the system speaks, "Three pages received with error."} "The facsimile message will be saved, erased, or forwarded. Press three to erase. Press seven to save the facsimile message. Press 13 to forward the facsimile message." |
| user dials: | [13] to forward the facsimile message. |
| system speaks: | "Record your comments . . . beep. " |
| user: | Speaks a voice message, dials [#], enters addresses or mailbox numbers to which the facsimile message is to be forwarded, and then dials [#] to send the message. |
| system speaks: | "Message forwarded" |

In the case of a facsimile message being forwarded to a distribution list, the facsimile message is not delivered to forward mailboxes that do not have the FAX COS already assigned. No error message is sent back to the user. If a facsimile message is forwarded to a mailbox X (with the FAX COS) that in turn is auto-copied to mailbox Y (without the FAX COS), the preferred embodiment will auto-copy the message to mailbox Y. The owner of mailbox Y will be able to listen to the message header, but will not be able to print the facsimile until the FAX COS is assigned to the mailbox. This situation is handled in the same manner as a mailbox that had the FAX COS assigned, received a facsimile message, and then subsequently had the FAX COS removed.

A caller can encounter at least four error conditions in attempting to forward a facsimile message from one mailbox to another mailbox. These errors are described below.

If a caller attempts to forward a facsimile message to a mailbox that does not have the appropriate COS attributes assigned (i.e. FAX or INFAX COS), the preferred embodiment speaks a message such as the following: "That mailbox is not configured for facsimile mail."

If a caller attempts to send a facsimile message to a mailbox that does not exist or has the COS attribute to block messages, the preferred embodiment speaks a message such as the following: "That mailbox does not exist."

If the preferred embodiment fails to successfully send or receive a facsimile message, the preferred embodiment speaks a message such as the following: "Facsimile transmission failed."

If no facsimile ports are available for transmission of a facsimile message (i.e. all busy), the preferred embodiment speaks a message such as the following: "Faxes cannot be sent or received at this time, please wait a moment and try again."

Any of these error conditions take the caller back to the automated attendant prompt or to the "Ready" prompt if the caller is logged onto a mailbox. The automated attendant function and the function of logging in or being logged into a mailbox is well known to those of ordinary skill in the art.

EXAMPLE #5

A user can configure a personal facsimile number via his/her mailbox options. The use of mailbox options, exclusive of facsimile options, is well known in the art. The personal facsimile number is called when a personal facsimile delivery option is selected in the print options configuration of the preferred embodiment. If the personal facsimile number is intended to be an off-site number, the trunk access code and appropriate delays are also programmed in.

The sequence of events in this fifth example is as follows.

| user enters: | [16] a mailbox number. |
|---|---|
| system speaks: | "For message waiting, press one, |

| | |
|---|---|
| | For security code, press two . . . ,<br>For FAX mailbox options, press nine,<br>To return to ready press pound" |
| user enters: | [9] on the telephone keypad. |
| system speaks: | "To set your personal FAX number, press one. To enable/disable automatic FAX printing, press two. To enable/disable automatic FAX deletion, press three." |
| user enters: | [1] |
| system speaks: | "Your personal FAX number is 1234, to erase it, press star or, enter a new personal FAX number, then press pound. For no change, only press pound." |
| user enters: | [7026#] and the extension number of the personal facsimile machine. |
| system speaks: | "Your personal FAX number is 7026."<br>"Ready." |

The personal facsimile delivery number can be an on-site or off-site number and can be up to 32 digits in length. The user may enter a "*" (asterisk) to program a delay in a well known manner. A user can mark a facsimile message for printing at the personal facsimile delivery number. Any number of facsimile messages within a user's mailbox can be marked this way. If the user attempts to mark a voice message for facsimile delivery, the preferred embodiment gives the following error message:

System speaks: "This function may only be used during or after listening to a facsimile."

If the personal facsimile delivery number selected has not been configured, the preferred embodiment gives the following error message:

System speaks: "That facsimile delivery number has not been configured."

EXAMPLE #6

A mailbox may also be configured with an automatic print option (auto-print). When a facsimile message is received by a mailbox with the auto-print option enabled, the facsimile message is automatically sent to a personal facsimile number for printing. If no personal facsimile number is defined for a mailbox, the facsimile message is sent to a group facsimile number defined in a mailbox information table.

A mailbox may also be configured with an automatic message delete option (auto-delete). When a facsimile message is successfully printed from a mailbox with the auto-delete option enabled, the facsimile message is automatically deleted from the mailbox. This feature can be used in conjunction with auto-print feature to implement an overflow capability for a company facsimile machine.

The sequence of events in this sixth example is as follows.

| | |
|---|---|
| user enters: | [16] a mailbox number. |
| system speaks: | "For message waiting, press one,<br>For security code, press two . . . ,<br>For FAX mailbox options, press nine,<br>To return to ready press pound" |
| user enters: | [9] |
| system speaks: | "To set your personal FAX number, press one. To enable automatic FAX printing, press two. To enable automatic FAX deletion, press three." |
| user enters: | [2] |
| system speaks: | "Automatic FAX printing enabled."<br>"Ready" |

If the auto-print option is already enabled, the preferred embodiment provides the option of disabling the feature by speaking the message: "To disable automatic FAX printing, press two." This message is spoken in the above sequence in place of the message: "To enable automatic FAX printing, press two."

Similarly, if the auto-delete option is already enabled, the preferred embodiment provides the option of disabling the feature by speaking the message: "To disable automatic FAX deletion, press three." This message is spoken in the above sequence in place of the message: "To enable automatic FAX deletion, press three."

EXAMPLE #7

A mailbox may also be configured with an OUTFAX COS. This class of service implements a facsimile on demand function. Facsimile on demand allows a caller to retrieve a previously stored facsimile from a particular mailbox. A facsimile on demand mailbox will be configured with the OUTFAX COS. This mailbox will automatically play a voice annotation message (if any) associated with the facsimile message. After the voice annotation message is played, a facsimile message configured within the facsimile on demand mailbox is transmitted to a caller who enters the facsimile on demand mailbox number. Only the first message will be played in this manner from an OUTFAX mailbox. The facsimile message data can be loaded into a facsimile on demand mailbox using the quick facsimile function described above in connection with Example #3 or forwarded from another facsimile mailbox.

The sequence of events in this seventh example is as follows.

| | |
|---|---|
| caller dials: | [1234] a mailbox with OUTFAX COS or forwards in from mailbox 1234 |
| system speaks: | "Please start facsimile reception." |
| system: | Sends facsimile tone, then sends facsimile data until the entire facsimile message is transmitted. |
| system speaks: | "You may now dial another extension number, or dial zero for assistance." |

If the facsimile on demand mailbox does not contain any facsimile messages or the first message in the mailbox is not a facsimile message, the preferred embodiment provides the following error message:

| | |
|---|---|
| system speaks: | "Facsimile transmission failed . . . "<br>"You may now dial another extension . . . " |

Thus, an improved call processing system with a means for processing facsimile data is described.

Although the present invention is described herein with reference to a specific embodiment, many modifications and variations therein will readily occur to those skilled in the art. Accordingly, all such variations and modifications are included within the intended scope of the present invention as defined by the following claims.

What is claimed is:

1. A system for processing facsimile messages, said system comprising:

a telephone line interface coupled to a plurality of telephone lines, said telephone line interface is configured by said system for receiving either one of a voice message and a facsimile message or both said voice message and said facsimile message via one of said plurality of telephone lines;

a message storage device having a plurality of mailboxes residing therein, each mailbox of said plurality of mailboxes having a unique mailbox identifier; and a control circuit for storing an appropriate one of said voice message and said facsimile message or both said voice message and said facsimile message in one of said plurality of mailboxes, said one of said plurality of mailboxes being identified by said unique mailbox identifier, each of said voice message and said facsimile message being identified by a unique message identifier, said control circuit further including logic for generating a message header which is stored in said message storage device and associated with said one of said plurality of mailboxes, said message header including information related to a facsimile device originating said facsimile message, said control circuit speaking at least a portion of said message header upon a user request, via one of said plurality of telephone lines, said control circuit still further including:

control logic for identifying a selected facsimile message in a selected mailbox of said plurality of mailboxes as identified by said mailbox identifier and said message identifier, said control logic further for receiving a user specified telephone number such that said facsimile message controller can transmit said selected facsimile message on one of said plurality of telephone lines corresponding to said user specified telephone number, said control logic still further for storing said user defined telephone number such that said telephone number may be retrieved when a subsequent request for facsimile transmission is received;

a control processor for enabling a connection between said selected mailbox and said one of said plurality of telephone lines; and a facsimile message controller for transmitting said selected facsimile message on said one of said plurality of telephone lines.

2. The system as claimed in claim 1 wherein said facsimile message controller transmits said selected facsimile message on one of said plurality of telephone lines corresponding to a predetermined default telephone number.

3. The system as claimed in claim 1 wherein said voice message and said facsimile message are received on the same telephone line.

4. The system as claimed in claim 1 wherein a user may optionally configure the system to print and delete said facsimile message after being successfully transmitted, options of printing and receiving said facsimile messages configured in said one of said plurality of mailboxes via said one of said plurality of telephone lines.

5. The system as claimed in claim 1 further including:
means for determining a length of a voice message or facsimile message stored in said message storage device.

6. The system as claimed in claim 1 wherein said message header further includes message origin information which identifies an origin of said facsimile message.

7. The system as claimed in claim 1 further including:
means for receiving call control information corresponding to said voice message or said facsimile message received via said one of said plurality of telephone lines, said call control information including a port, a trunk group, and a called extension number corresponding to said voice message or said facsimile message; and means for deriving said unique mailbox identifier from said call control information.

8. The system as claimed in claim 1 further including:
means for adding text characters to said facsimile message.

9. The system as claimed in claim 1 further including:
means for receiving a voice annotation message with said facsimile message.

10. The system as claimed in claim 1 further including:
means for notifying a caller after said facsimile message has been stored in said one of said plurality of mailboxes.

11. In a call processing system having a message storage device, a plurality of mailboxes residing therein, and a message control system (MCS), a plurality of telephone lines coupled to the call processing system wherein each of the lines can, via said call processing system, carry voice and facsimile transmission, said call processing system including means for determining whether an incoming call is a voice or facsimile transmission, means for providing call control information, and a facsimile controller comprising:

a control processor, said control processor for receiving said call control information;

a plurality of facsimile modems coupled to said control processor; and a memory coupled to said control processor for storage of facsimile processing logic and data, said facsimile processing logic including:
  i) means for selecting an available one facsimile modem of said plurality of facsimile modems; and
  ii) means for connecting said available one facsimile modem with said incoming call.

12. A call processing system comprising:
a message control system (MCS) coupled to a central office (CO) and a private branch exchange (PBX), the MCS including:
  means for receiving an incoming call from said CO indicating an extension number,
  means for determining if said incoming call is a voice call or a facsimile call,
  means for routing said incoming call to said PBX and sending said extension number to said PBX if said incoming call is a voice call;

a message storage device having a plurality of mailboxes residing therein, each mailbox of said plurality of mailboxes having a unique mailbox identifier; and connected to said MCS for storing a facsimile message received from said CO; and means for storing said facsimile message in a mailbox associated with said extension number, said mailbox within said message storage device.

13. A call processing system comprising:
a private branch exchange (PBX) coupled to trunk lines incoming from a central office (CO) for receiving calls directed to extension numbers on individual telephone lines on the PBX; and a message control system (MCS) coupled to said PBX, said MCS including:
  means for forwarding all calls received via the trunk lines directly to said MCS and providing said extension numbers to said MCS,
  means for determining if said calls received via the trunk lines are voice calls or facsimile calls,
  means for routing said voice calls back to said PBX to attempt to ring said extension numbers, and
  means for processing a facsimile message and storing it in a mailbox associated with said extension number.

14. The call processing system as claimed in claim 13 further including means for receiving a quick facsimile request and an extension number via one of said individual telephone lines on which said quick facsimile request is received, said MCS sending a facsimile message to said extension number in response to said quick facsimile request.

* * * * *

UNITED STATES PATENT AND TRADEMARK OFFICE
CERTIFICATE OF CORRECTION

PATENT NO. : 5,517,556

DATED : May 14, 1996

INVENTOR(S) : Pounds et al.

It is certified that error appears in the above-identified patent and that said Letters Patent is hereby corrected as shown below:

In column 2, line 36, "therefore, o difficult" should have been typed --therefore, difficult--.

In column 12, line 13, "cable 1" should have been typed --cable1--.

In column 22, line 38, "24 16" should have been typed --2416--.

Signed and Sealed this

Twenty-second Day of October, 1996

*Attest:*

BRUCE LEHMAN

*Attesting Officer*     *Commissioner of Patents and Trademarks*